United States Patent
Uchino et al.

(10) Patent No.: US 7,791,998 B2
(45) Date of Patent: Sep. 7, 2010

(54) INFORMATION RECORDING DEVICE, INFORMATION RECORDING METHOD, AND INFORMATION RECORDING PROGRAM

(75) Inventors: Hiroyuki Uchino, Saitama (JP); Yoshio Sasaki, Saitama (JP); Kunihiko Horikawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 717 days.

(21) Appl. No.: 11/630,693

(22) PCT Filed: Jun. 27, 2005

(86) PCT No.: PCT/JP2005/011741

§ 371 (c)(1),
(2), (4) Date: Feb. 27, 2007

(87) PCT Pub. No.: WO2006/001423

PCT Pub. Date: Jan. 5, 2006

(65) Prior Publication Data

US 2008/0037392 A1 Feb. 14, 2008

(30) Foreign Application Priority Data

Jun. 28, 2004 (JP) .............................. 2004-189767

(51) Int. Cl.
*G11B 7/00* (2006.01)
(52) U.S. Cl. .............. 369/47.53; 369/53.31; 369/53.34; 369/116
(58) Field of Classification Search .............. 369/47.53, 369/53.31, 53.34, 116
See application file for complete search history.

(56) References Cited

U.S. PATENT DOCUMENTS

| 6,775,214 B2 * | 8/2004 | Suzuki .................... 369/47.51 |
| 6,987,717 B2 * | 1/2006 | Hagiwara et al. ......... 369/47.53 |
| 7,184,379 B2 * | 2/2007 | Tsukihashi et al. ....... 369/47.43 |
| 2002/0136121 A1 * | 9/2002 | Salmonsen et al. ....... 369/47.53 |

(Continued)

FOREIGN PATENT DOCUMENTS

JP 3159454 2/2001

(Continued)

*Primary Examiner*—Wayne R Young
*Assistant Examiner*—Brenda Bernardi
(74) *Attorney, Agent, or Firm*—Young & Thompson

(57) ABSTRACT

Based on actual recording power information obtained during test writing, a recording power is efficiently controlled with high accuracy during actual recording. An information recording apparatus irradiates a laser light onto an information recording medium such as an optical disc to record data and reproduce the recorded data. In recording actual data such as data designated by a user, the information recording apparatus temporarily stops recording at the time when predetermined amount of data is recorded, and confirms recording quality. Namely, the apparatus reproduces the recorded data and determines the recording quality based on the reproduced data. When it is determined that the recording quality is within an appropriate range, the recording of the actual data is continued at the recording power. Meanwhile, when it is determined that the recording quality is out of the appropriate range, the recording power is corrected so that the recording quality becomes within the appropriate range, and the actual data is recorded. Thereby, even when the optimum recording power is changed due to some causes and condition change after recording start of the actual data, the recording power can be correspondently corrected, and accurate information recording with the appropriate recording power can be realized.

10 Claims, 15 Drawing Sheets

U.S. PATENT DOCUMENTS

| | | | |
|---|---|---|---|
| 2004/0136301 A1* | 7/2004 | Ren et al. | 369/53.34 |
| 2004/0145978 A1* | 7/2004 | Yamamoto | 369/44.32 |
| 2004/0156286 A1* | 8/2004 | Miyaki | 369/47.53 |
| 2005/0147001 A1* | 7/2005 | Takahashi | 369/47.5 |
| 2006/0072410 A1* | 4/2006 | Ogawa | 369/47.53 |
| 2007/0002706 A1* | 1/2007 | Baek et al. | 369/47.53 |
| 2009/0141601 A1* | 6/2009 | Wada | 369/47.53 |

FOREIGN PATENT DOCUMENTS

| | | | |
|---|---|---|---|
| JP | 2003-228840 | | 8/2003 |
| JP | 2003228840 A | * | 8/2003 |
| JP | 2004-234812 | | 8/2004 |

* cited by examiner

INFORMATION RECORDING DEVICE, INFORMATION RECORDING METHOD, AND INFORMATION RECORDING PROGRAM

TECHNICAL FIELD

The present invention relates to a technique of recording information onto an information recording medium such as an optical disc.

BACKGROUND TECHNIQUE

In an information recording and reproduction apparatus recording information onto an information recording medium such as an optical disc, an optimum recording power of a laser light used for recording operation is set by an OPC (Optimum Power Calibration) process in correspondence to a type of the optical disc, a type of the information recording and reproduction apparatus and a recording speed. Namely, calibration of the laser power is performed. Thereby, the appropriate recording operation can be realized. For example, when the optical disc is loaded and a writing command is inputted, light intensity is gradually switched in order, and data for test writing is recorded in an OPC area. Thereby, the so-called test writing process is executed. Afterward, the data for the test writing thus recorded is reproduced, and the reproduction result is judged by a predetermined evaluation standard. Thereby, the optimum recording power is set. An example of a determination method of the optimum recording power is disclosed in Patent Reference-1.

Meanwhile, a technique of increasing the recording speed (or reproduction speed) of the information is developed by increasing of a rotation speed of the optical disc. For example, as for a CD-R being an example of the optical disc, as the rotation speed of the optical disc is increased, the recording speed of the data is increased, e.g., 24-time high speed and 48-time high speed.

When the rotation speed of the optical disc is increased in this manner, it is preferable that the OPC process is executed at a liner speed corresponding to a recording track actually used for recording the data. However, since the OPC process is basically executed on the innermost circumferential side of the optical disc, the liner speed is the lowest at the same rotation speed. Therefore, the actual liner speed cannot be realized on the innermost circumferential side due to a specification or physical restriction of a motor for controlling the rotation. Particularly, at CLV (Constant Liner Velocity) at which the liner speed becomes constant in any recording area of the optical disc, the rotation speed on the innermost circumferential side becomes larger than that on the outermost circumferential side. Thus, on a DVD being an example of the optical disc, high-speed rotation of 12000 rpm is necessary on the innermost circumferential side, in order to realize the recording speed or the liner speed of 8-times higher, for example. Due to the specification of the motor, it is difficult to realize such high-speed rotation. It is technically problematic that such high-speed rotation causes damage of the optical disc. In addition, even if such high-speed rotation is realized, it is also technically problematic that a servo for controlling the motor becomes unstable and detection accuracy of asymmetry and a β value is lowered. So as to solve the above problems, such a technique that the OPC process is executed at the low rotation speed and the optimum recording power at the high-speed rotation is estimated and obtained based on the result is introduced to the CD-R being an example of the optical disc.

However, in the above method, since the optimum recording power at the time of the actual recording is determined (estimated) based on the test writing information in the recording power area different from that at the time of the actual recording, the determination accuracy of the optimum recording power is low. Therefore, when the optimum recording power is corrected at the time of the actual recording, the recording power is sometimes out of a power margin. Additionally, since accuracy of actual recording power information (a relation between the recording power and the asymmetry or the β value) obtained at the time of the test writing is low, the information cannot be used for calculation of recording power correction amount after starting of the actual recording, or even if the information is used, the calculation of the appropriate correction amount is difficult. Hence, it is impossible to effectively correct the recording power after starting of the actual recording.

Patent Reference-1: Japanese Patent No. 3159454

DISCLOSURE OF INVENTION

The present invention has been achieved in order to solve the above problems. It is an object of this invention to provide an information recording apparatus, an information recording method and an information recording program, capable of efficiently controlling a recording power with high accuracy during actual recording, based on actual recording power information obtained at the time of test writing.

According to one aspect of the present invention, there is provided an information recording apparatus including: a recording unit which irradiates a laser light on an information recording medium to record data thereon; a determination unit which stops recording by the recording unit at a time when predetermined amount of data is recorded during actual data recording and determines whether or not recording quality of recorded data is within an appropriate range based on reproduction data obtained by reproducing the recorded data by the reproduction unit; and a correction unit which corrects a recording power of the recording unit so that the recording quality becomes within the appropriate range, when it is determined that the recording quality is out of the appropriate range.

The above information recording apparatus irradiates the laser light on the information recording medium such as the optical disc to record the data thereon and reproduce the recorded data therefrom. After starting of the recording of the actual data, e.g., data designated by a user, the information recording apparatus temporarily stops the recording at the time when the predetermined amount of data is recorded, and confirms the recording quality. Namely, the recorded data is reproduced, and determines the recording quality based on the reproduction data. When it is determined that the recording quality is within the appropriate range, the recording of the actual data is continued at the recording power. Meanwhile, when it is determined that the recording quality is out of the appropriate range, the recording power is corrected so that the recording quality becomes within the appropriate range, and the actual data is recorded. Thereby, even when the optimum recording power is varied due to some causes and condition variation at the time of the recording of the actual data, the recording power can be correspondently corrected, and the accurate information recording becomes possible with the appropriate recording power.

In a manner, the above information recording apparatus may further include a test writing unit which executes test writing on the information recording medium in order to determine an optimum recording power in advance of the actual data recording, and the actual data recording may start with the optimum recording power determined by the test writing.

In this manner, in advance of the actual data recording, the optimum recording power corresponding to the information recording medium is determined by a method, e.g., the so-called OPC, and the actual data recording starts with the recording power. Thereby, the actual data recording can start with the optimum recording power. After starting the actual data recording, when the predetermined amount of data is recorded, the recording is temporarily stopped. Then, as described above, the confirmation of the recording quality and the necessary correction of the recording power are executed. Therefore, after starting the recording, the recording can be continued at the appropriate recording power, too.

In a preferred example of the above information recording apparatus, the test writing unit may obtain a relation between a recording quality evaluation parameter and a recording power by the test writing, and the correction unit may correct the recording power based on the relation between the recording quality evaluation parameter and the recording power.

In this manner, in the test writing executed in advance of the actual data recording, the relation between the predetermined recording quality evaluation parameter and the recording power, corresponding to the information recording medium, is obtained. When it is determined that the recording quality is out of the appropriate range after starting of the recording, based on the relation, the recording power is corrected to become the appropriate recording quality. If the relation between the predetermined recording quality evaluation parameter and the recording power, obtained by the test writing, is accurate, it becomes possible to accurately correct the recording power after the actual data recording.

In a preferred example of the above information recording apparatus, the determination unit may determine that the recording quality is within the appropriate range, when a recording quality evaluation parameter is within a predetermined range. The recording quality evaluation parameter may be one of an asymmetry, a β value and a modulation degree, calculated by reproducing the recorded data. Additionally, when an asymmetry calculated by reproducing the recorded data is used as the recording quality evaluation parameter, the determination unit may determine that the recording quality is within the appropriate range when the a symmetry is within a range of 5% pp from 0% as a center. The recorded data is reproduced from the information recording medium, and the RF signal is obtained. Then, the asymmetry, the β value and the modulation degree are calculated, and it is determined whether or not they are within the predetermined range. Thereby, the recording quality can be easily confirmed.

In a preferred example of the above information recording apparatus, the predetermined amount may be minimum data amount capable of calculating the recording quality evaluation parameter with necessary accuracy. The reproduction data capable of calculating the above recording quality evaluation parameter is necessary in order to determine the recording quality. Meanwhile, it is preferable that the amount of data recorded to confirm the recording quality is as small as possible after starting of the actual data recording. Therefore, it is preferable that the predetermined amount of the actual data recorded until the temporary stop is the minimum data amount capable of calculating the recording quality evaluation parameter with necessary accuracy.

In a preferred example of the above information recording apparatus, the determination unit may repeat the determination until the recording quality, obtained by a recording power corrected by the correction unit, becomes within the appropriate range. Thereby, it is prevented that the actual data recording is continued with the recording quality out of the appropriate range.

In a preferred example of the above information recording apparatus, the determination unit may execute the determination when the actual data recording is executed by predetermined amount of recording data. On even a single information recording medium, the recording sensitivity is sometimes different at the positions on the recording surface. Thus, if the recording quality is repeatedly determined not only immediately after starting the actual data recording but also for each recording of the predetermined recording data amount afterward, it becomes possible to suppress an influence of the recording sensitivity difference and realize the recording on the entire information recording media with high accuracy.

In a preferred example of the above information recording apparatus, the determination unit may execute the determination, when a temperature in a vicinity of a light source of the laser light varies by a predetermined temperature. The laser diode for emitting the laser light for the recording and other light sources have such a property that the characteristic of the emitted laser light is changed dependently on the temperature. Therefore, when the temperature change equal to or larger than the predetermined value occurs, the recording quality is determined, and the recording power is corrected as the need arises. Thereby, the accurate recording can be continued without being affected by the environmental change during the continuous recording.

In another manner of the above information recording apparatus, the test writing unit may include: an obtaining unit which obtains a special OPC strategy which prescribes a waveform of the laser light used for calculating the optimum recording power of the laser light at a time of recording of the information at a second recording speed different from a first recording speed, at the first recording speed; and a power calculation unit which executes test writing by using the special OPC strategy at the first recording speed to calculate the optimum recording power.

In this manner, the liner speed of the test writing is different from that at the time of the actual data recording. The test writing is performed by using the special OPC strategy for performing the test writing with the same or substantially same recording power as that at the time of the actual data recording, and the optimum recording power is determined. Hence, it becomes possible to obtain the actual recording power information corresponding to the case that the recording is performed with the same recording power as that at the time of the actual data recording, i.e., the relation between the recording power and the recording quality evaluation parameter. Based on the actual recording power information, the correction of the recording power can be performed with high accuracy.

According to another aspect of the present invention, there is provided an information recording method including: a recording process which irradiates a laser light on an information recording medium to record data thereon; a determination process which stops recording at a time when predetermined amount of data is recorded during actual data recording and determines whether or not recording quality of recorded data is within an appropriate range based on reproduction data obtained by reproducing the recorded data; and a correction process which corrects a recording power of the recording unit so that the recording quality becomes within the appropriate range, when it is determined that the recording quality is out of the appropriate range. By this method, even when the optimum recording power is varied due to some causes and condition change after the start of the recording of the actual data, the recording power can be correspondently corrected, and the accurate information recording becomes possible with the appropriate recording power, too.

According to still another aspect of the present invention, there is provided an information recoding program executed by an information recording apparatus comprising a computer, making the computer function as: a recording unit which irradiates a laser light on an information recording medium to record data thereon; a determination unit which stops recording by the recording unit at a time when predetermined amount of data is recorded during actual data recording and determines whether or not recording quality of recorded data is within an appropriate range based on reproduction data obtained by reproducing the recorded data; and a correction unit which corrects a recording power of the recording unit so that the recording quality becomes within the appropriate range, when it is determined that the recording quality is out of the appropriate range.

The above information recording apparatus can be realized by executing the information recording program in the information recording apparatus including the computer.

BRIEF DESCRIPTION OF THE REFERENCE NUMBER

100 Optical disc
103 Strategy recording area
300 Information recording apparatus
352 Optical pickup
354 CPU
355 Memory

DETAILED DESCRIPTION OF THE PREFERRED EMBODIMENTS

The preferred embodiment of the present invention will now be described below with reference to the attached drawings.

[Embodiment of Information Recording Medium]

Figure 1:
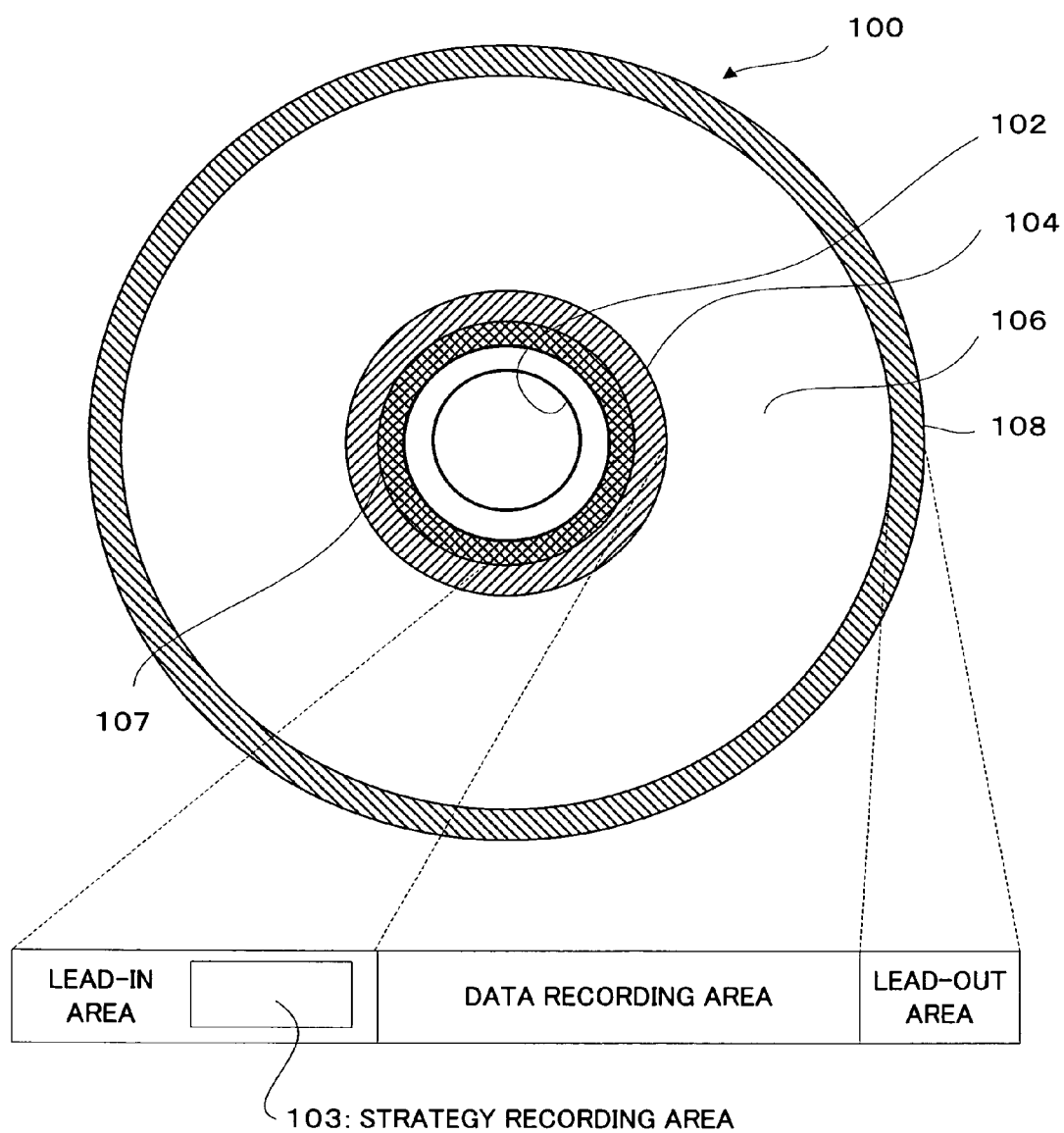
FIG. 1 is an explanation view showing an embodiment of an information recording medium according to the present invention, at the upper part of which the structure of an optical disc having plural areas is shown by a schematic plane view, and at the low part of which the area structure in the radial direction is correspondingly shown by a concept view.

First, a description will be given of the optical disc being an embodiment according to the information recording medium of the present invention, with reference to FIG. 1. In FIG. 1, at the upper part thereof, the structure of the optical disc having plural areas is shown by a schematic plane view. At the low part thereof, the area structure in the radial direction is correspondently shown by a conceptual view.

As shown in FIG. 1, an optical disc 100 is recordable (writable) in plural times or only once in various kinds of recording methods such as a magneto-optical method and a phase change method, for example. Like a DVD, on a recording surface on a disc main body having a diameter of substantially 12 cm, a PCA (Power Calibration Area) 107, a lead-in area 104, a data recording area 106 and a lead-out area 108 are provided from the inner circumference to the outer circumference with a center hole 102 as the center. In each of the areas, groove tracks and land tracks are alternately provided spirally or concentrically with the center hole 102 as the center. The groove track may be wobbled, and prepits may be formed on one or both of the tracks.

The lead-in area 104 includes a strategy recording area 103 in which the strategy used for the actual data recording and the test writing is recorded. The test writing is performed in a PCA 107 serving as the OPC area by using various kinds of strategies recorded in the strategy recording area 103, which will be further described later.

The present invention is not limited to only the optical disc having the three areas. For example, even though the optical disc does not have the lead-in area 104 and the lead-out area 108, file structure, which will be explained below, can be constructed. In addition, the structure of the lead-in area 104 and the lead-out area 108 may be further segmentalized, as described below.

[Configuration of Information Recording and Reproduction Apparatus]

Figure 2:
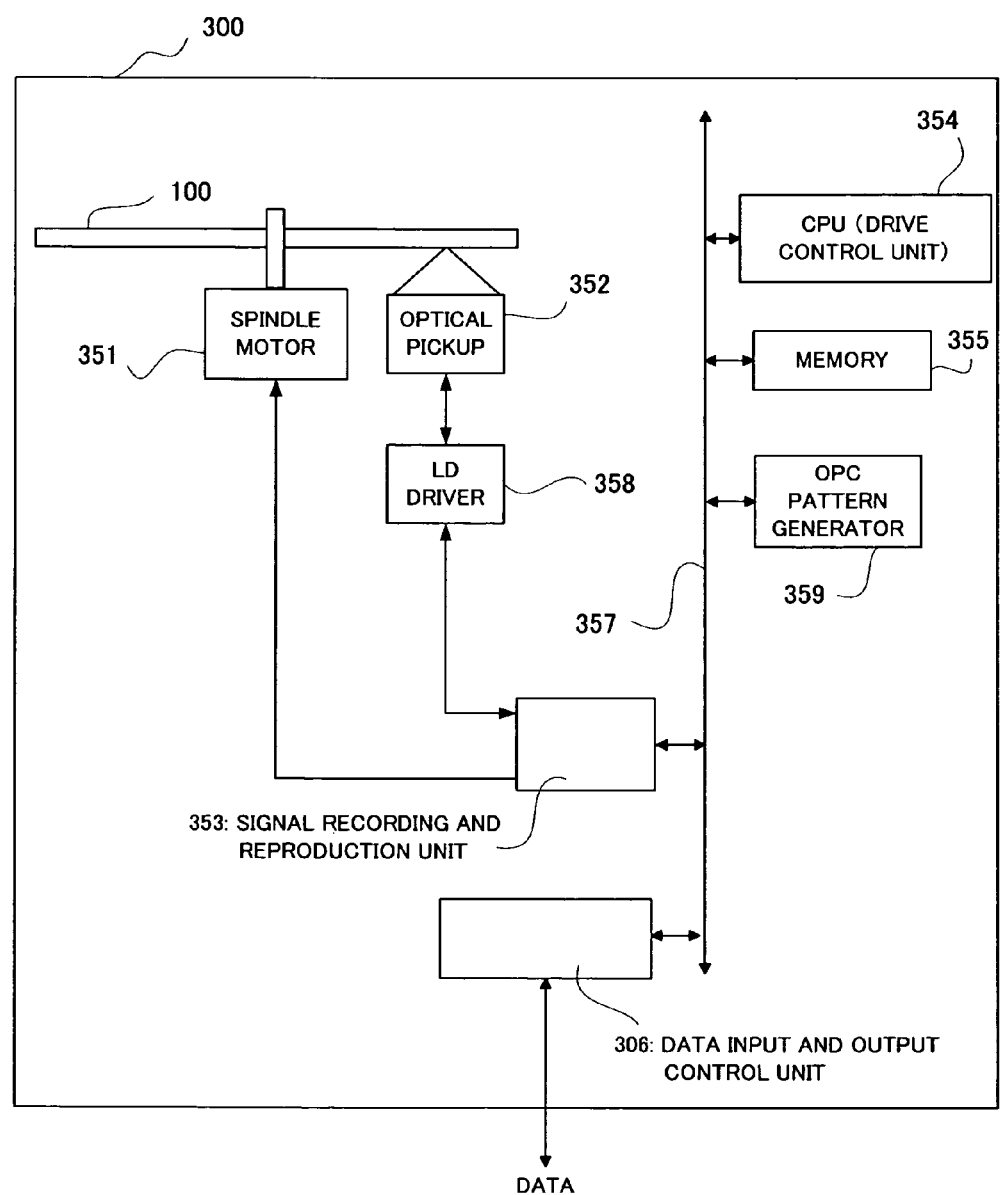
FIG. 2 is a block diagram of an information recording and reproduction apparatus according to the embodiment of the present invention.

Next, a description will be given of a configuration of an information recording and reproduction apparatus 300 according to the embodiment of the present invention, with reference to FIG. 2. FIG. 2 is a block diagram of the information recording and reproduction apparatus 300 according to the embodiment of the present invention. The information recording and reproduction apparatus 300 has a function of recording the data onto the optical disc 100 and a function of reproducing the data recorded onto the optical disc 100. Namely, this embodiment is not only the embodiment of the information recording and reproduction apparatus, but also both of embodiments of an information recording apparatus and an information reproduction apparatus.

A description will be given of an inner configuration of the information recording and preproduction apparatus 300, with reference to FIG. 2. The information and reproduction apparatus 300 is an apparatus for recording the information onto the optical disc 100 and reading the information recorded onto the optical disc 100 under the control of a CPU 354.

The information recording and reproduction apparatus 300 includes the optical disc 100, a spindle motor 351, an optical pickup 352, a signal recording and reproduction unit 353, a CPU (drive control unit) 354, a memory 355, a bus 357, an LD driver 358, an OPC pattern generator 359 and a data input and output control unit 306.

The spindle motor 351 rotates and stops the optical disc 100, and operates at the time of the access to the optical disc. More specifically, while receiving the spindle servo by a servo unit (not shown), the spindle motor 351 rotates and stops the optical disc 100 at a predetermined speed.

When the data is recorded at the recording speed of 8x, the spindle motor 351 operates so that the optical disc 100 rotates at the speed higher than the case in which data is recorded by the recording speed of 4x or 6x. When the data is recorded at the recording speed of 6x, the spindle motor 351 operates so that the optical disc 100 rotates at the speed higher than the case in which data is recorded by the recording speed of 4x.

The optical pickup 352 performs the recording and reproduction onto the optical disc 100, and includes the laser device (e.g., the laser diode) and the lens. More specifically, to the optical disc 100, the optical pickup 352 irradiates the light beam such as the laser beam with a first power as the reading light at the time of the reproduction, and modulates and irradiates it with a second power as the writing light at the time of the recording.

The signal recording and reproduction unit 353 controls the spindle motor 351 and the optical pickup 352 to perform the recording and reproduction onto the optical disc 100.

The memory 355 is used for general data process in the disc drive 300 such as a buffer area of the recording and reproduction data and an area used as an intermediate buffer at the time of converting the recording and reproduction data into data usable in the signal recording and reproduction unit 353. In addition, the memory 355 includes an ROM area in which the program for executing the operation as such a recorder apparatus is stored and an RAM area in which a variable necessary for the buffer used for compression and extension of video data and the program operation is stored.

In this embodiment, a recording strategy for 8x (or a recording strategy for 4x and a recording strategy for 6x), a special OPC strategy for 4x and a special OPC strategy for 6x, or various kinds of strategies other than them may be recorded in the memory 355.

The CPU (drive control unit) 354 is connected to the signal recording and reproduction unit 353 and the memory 355 via the bus 357 and gives an instruction to each of the control units to control the entire information recording and reproduction apparatus 300. The software for the operation of the CPU 354 is normally stored in the memory 355.

The LD driver 358 oscillates the laser diode of the optical pickup 352 at a predetermined frequency to control the laser beam irradiated by the optical pickup 352.

The OPC pattern generator 359 is used in order to generate a predetermined OPC pattern with using various kinds of strategies (particularly, a special OPC strategy for mx and an ordinary OPC strategy for nx) described later.

The data input and output unit 306 controls the data input and output to and from the information recording and reproduction apparatus 300 to store and take out the data in and from the data buffer in the memory 355.

[Optimum Recording Power Determination]

Next, a description will be given of a determination method of the optimum recording power according to the present invention. If the determination method of the optimum recording power according to the present invention is briefly explained, first, in advance of recording the actual data (user data actually recorded in the data recording area 106, which is thus referred to in order to distinguish it from the test writing data) in the data recording area 106, the test writing is performed by the so-called OPC (Optimum Power Control). By the test writing, the actual recording power information is obtained, and the recording power is determined based on the information. The test writing is performed by using the special OPC strategy, which will be explained later. The actual recording power information is information showing a relation between the recording power and various kinds of recording quality evaluation parameters. The recording quality evaluation parameter, which is used for evaluating the recording quality of the data recorded onto the optical disc, includes the asymmetry, the β value and the modulation degree.

After the test writing ends in this manner, the actual data is recorded in the data recording area 106 by using the determined recording power. After the start of the recording of the actual data, the recording is temporarily stopped when the predetermined amount of actual data is recorded. Subsequently, the recorded actual data is reproduced, and the recording quality is evaluated. When the recording quality is out of the appropriate range, the recording power is corrected by using the actual recording power information obtained at the time of the test writing.

Next, a description will be given of the recording quality evaluation parameter. The recording quality evaluation parameter, which is a parameter used for evaluating the recording quality of the data recorded on the optical disc, includes the asymmetry, the modulation degree and the β value.

Figure 3:
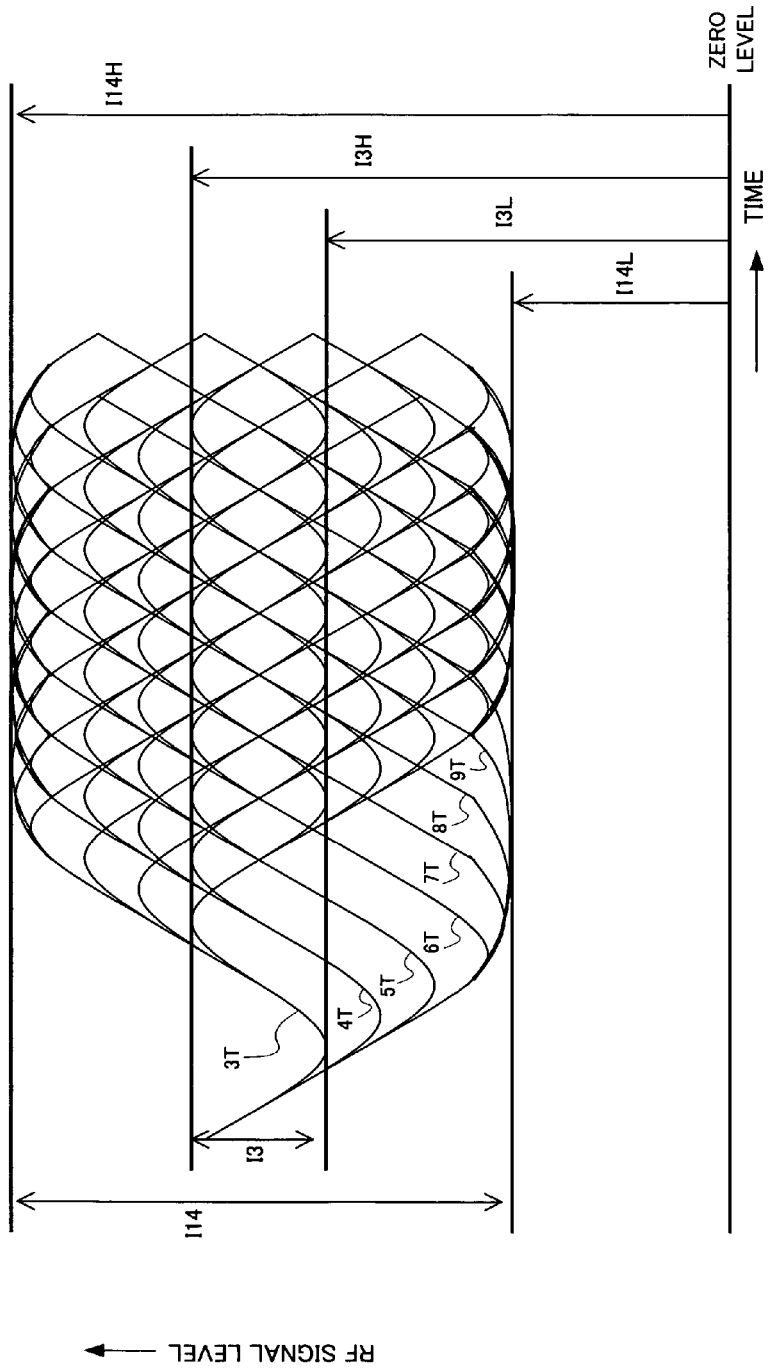
FIG. 3 is a diaphragm for explaining definitions of a modulation degree and an asymmetry.

FIG. 3 conceptually shows the modulation degree and the asymmetry. "Modulation degree" is a ratio of magnitude of an RF signal (an RF signal obtained by photo-electronically converting the returned light from the recording medium and including a DC component) obtained by reading the data recorded on the recording medium with respect to a difference between the zero level and the peak level of the RF signal. FIG. 3 shows an example of the RF signal waveform obtained by reproducing the recording medium. Namely, the modulation degree is the ratio of an RF signal magnitude I14 with respect to a difference I14H between the zero level and the peak level, which is given by an equation below.

$$\text{Modulation Degree} = I14/I14H \quad (1)$$

Generally, when forming of the recording mark on the recording medium is insufficient due to insufficient recording power, the modulation degree becomes low, and a noise influence to a reproduction signal becomes large. Thus, the S/N ratio decreases, and an adverse effect occurs to the reproduction compatibility. "Having the reproduction compatibility" means that the recording medium recorded by a certain recording apparatus can be appropriately reproduced by a different reproduction apparatus.

"Asymmetry" is a position of the shortest mark with respect to a predetermined long mark, giving the largest magnitude in the RF signal reproduced from the recording medium, and it is concretely given by an equation below.

$$\text{Asymmetry} = \{(I14H+I14L)/2 - (I3H+I3L)/2\}/I14 \quad (2)$$

Namely, as shown in FIG. 3, it shows a positional relation between the intermediate level of the levels I14H and I14L of the RF signal corresponding to the predetermined long mark (14T mark) and the intermediate level of the levels I3H and I3L of the RF signal corresponding to the shortest mark.

Figure 4:
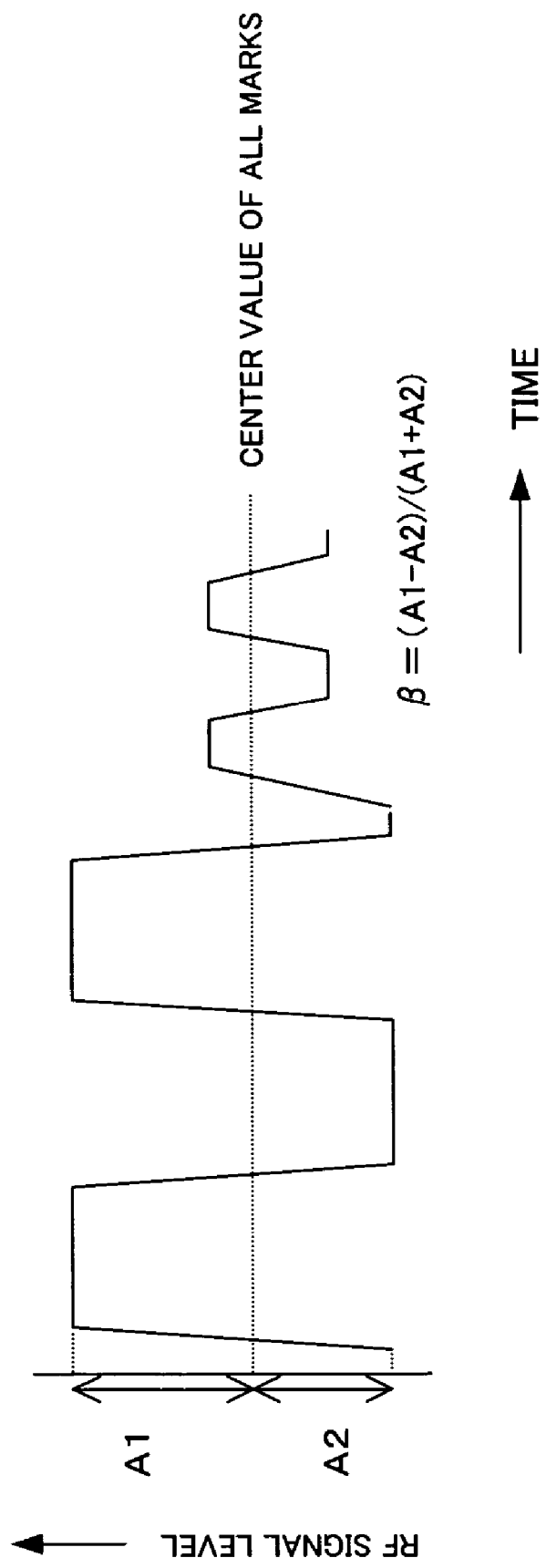
FIG. 4 is a diaphragm schematically showing a definition of a β value.

FIG. 4 schematically shows a definition of the β value. The β value is a parameter showing shift amount of an average level of the RF signal with respect to a center value (a center value of all the marks) of a magnitude level of the RF signal. The average level of the RF signal can be obtained by making the RF signal pass through an LPF, for example. The center value of the magnitude level of the RF signal can be obtained by calculation on the basis of the minimum level and the maximum level of the RF signal corresponding to the reproduced recording data. As the β value becomes closer to "0", i.e., as the shift amount of the average level of the RF signal with respect to the center value of the magnitude level of the RF signal becomes smaller, the β value becomes more preferable.

Figures 5A, 5B:
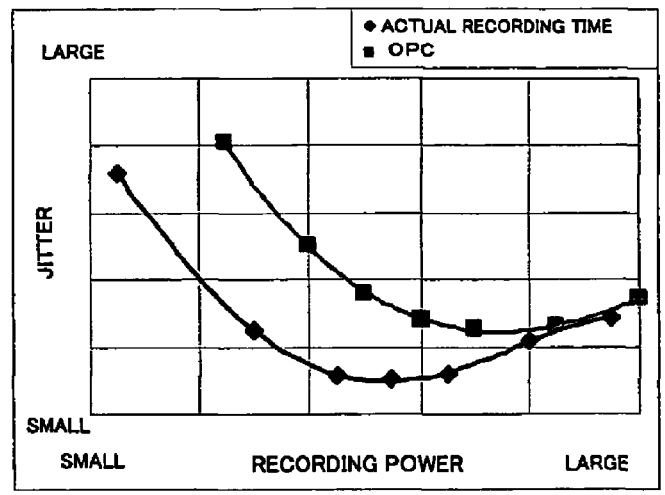
FIGS. 5A and 5B are graphs showing examples of relations between a recording power and jitter and between the recording power and the asymmetry at the time of actual recording and at the time of test writing.

Next, a description will be given of a characteristic of the recording power at the time of the actual recording and at the time of the test writing. FIG. 5A shows relations between the recording power and the jitter at the time of the actual recording and at the time of the test writing (OPC), and FIG. 5B shows relations between the recording power and the asymmetry at the time of the actual recording and at the time of the test writing. In FIGS. 5A and 5B, the characteristic at the time of the test writing is shown as "OPC". The test writing here is performed by using the special OPC strategy for the test writing. The special OPC strategy is generated so that the time width thereof becomes substantially same (particularly, same at 3T) as that of the strategy at the time of the actual recording, and the laser emission waveform becomes substantially same at the time of the test writing and at the time of the actual recording.

As shown in FIG. 5A, the shift occurs to the relation between the recording power and the jitter at the time of the actual recording and at the time of the test writing. Meanwhile, as shown in FIG. 5B, the relation between the recording power and the asymmetry substantially coincides at the time of the actual recording and at the time of the test writing, and the variation ratios of the asymmetry with respect to the recording power substantially coincides in the necessary recording power area at the time of the actual recording, i.e., in the recording power area used for the actual recording. Therefore, by the test writing by the above-mentioned special OPC strategy, it becomes possible to obtain the same relation between the recording power and the asymmetry as that at the time of the actual recording. That is, it becomes possible to obtain the characteristic (actual recording power information) obtained in such a case that the recording is performed with the same recording power as that at the time of the actual recording by performing the test writing by using the above-mentioned special OPC strategy.

As described above, it is desirable that the test writing is performed at the same liner speed as that at the time of the actual recording. However, since the test writing is usually performed in the innermost circumference of the disc, the test writing cannot be performed with the same recording power as that at the time of the actual recording, particularly in a case of the high-speed recording of 6x and 8x. Thus, there is normally employed such a method that the optimum recording power at the time of the high speed recording is estimated based on the optimum recording power at the time of the low-speed recording. However, an estimation error is included therein, and the accuracy is insufficient. In this point, since the test writing can be performed with the same laser emission waveform (same time width) as that at the time of the actual recording by the above-mentioned special OPC strategy, the same relation between the recording power and the asymmetry as that at the time of the actual recording can be obtained. The accuracy in this case is extremely higher, as compared with the case using the estimation. Therefore, if the characteristic obtained by the test writing is used for the correction of the recording power at the time of the actual recording, the recording power can be corrected with high accuracy.

As shown in FIG. 5B, a constant offset normally occurs to the relations between the recording power and the asymmetry at the time of the actual recording and at the time of the test writing by the special OPC strategy (the respective characteristics are shifted in the up-and-down direction by the amount of offset in FIG. 5B). But, since the amount of offset is a substantially fixed value, the existence of the offset is not a problem if the recording power is corrected in consideration of the fixed amount of offset. In addition, the offset value can be set to "0" in some cases of setting the special OPC strategy, and in this case, it becomes unnecessary to consider the amount of offset in correcting the recording power.

As described above, the recording power at the time of the actual recording is corrected by using the relation between the recording power and the asymmetry obtained by the test writing using the special OPC strategy, which is only an example. As described above, the β value and the modulation degree other than the asymmetry can be used as the recording quality evaluation parameter (information indicating the relation between the recording power and any one of the recording quality evaluation parameters, obtained by the test writing by the special OPC strategy, is referred to as "actual recording power information"). Therefore, the relation between the recording power and the β value or the relation between the recording power and the modulation degree is obtained as the actual recording power information at the time of the test writing, based on which the recording power may be corrected at the time of the actual recording. In any case, as far as the recording power correction is executed by using the actual recording power information obtained by the test writing by the special OPC strategy, the correction with high accuracy becomes possible at the time of the actual recording.

Figure 6A:
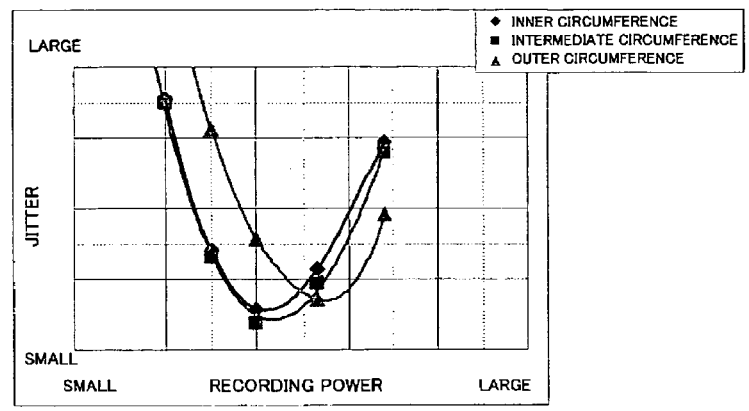
FIGS. 6A and 6B are graphs showing relations between the recording power and the jitter and between the recording power and the asymmetry at an inner circumferential position, an intermediate circumferential position and an outer circumferential position of certain recording media.
Figure 6B:
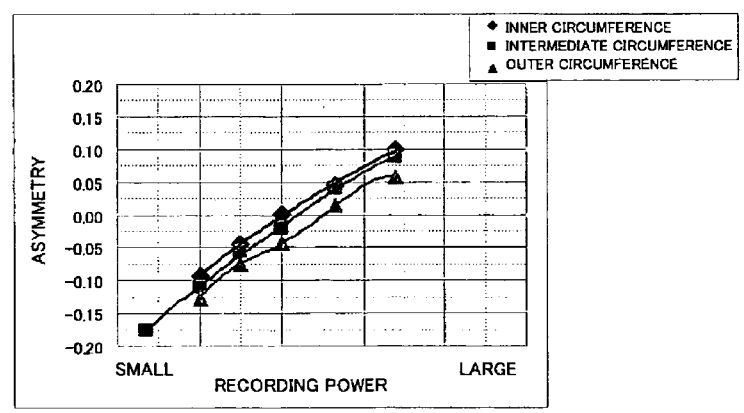
Figure 7A:
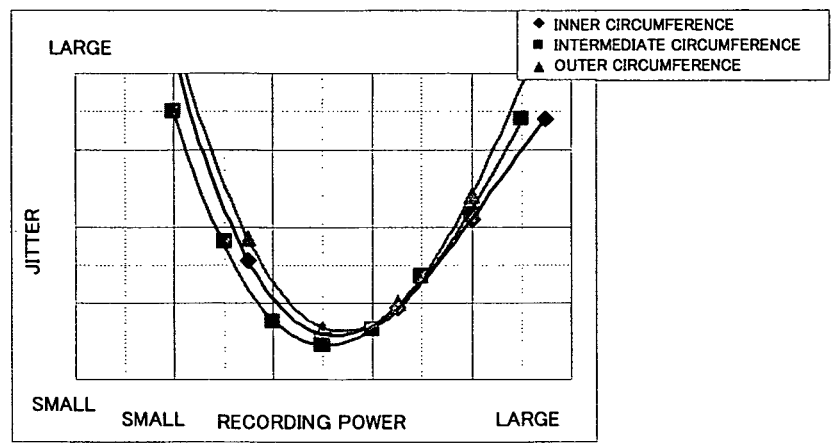
FIGS. 7A and 7B are graphs showing relations between a recording power and jitter and between the recording power and an asymmetry at an inner circumferential position, an intermediate circumferential position and an outer circumferential position of other recording media.
Figure 7B:
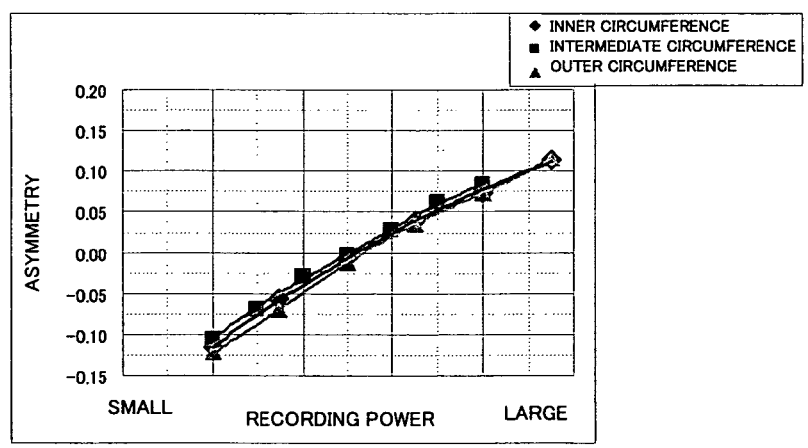

Next, a description will be given of the characteristic variation of each recording media. FIG. 6A shows the relation between the recording power and the jitter of certain media A, and FIG. 6B shows the relation between the recording power and the asymmetry of the media A. Additionally, FIG. 7A shows the relation between the recording power and the jitter of certain media B, and FIG. 7B shows the relation between the recording power and the asymmetry of the media B. The media A are an example of the media having an undesired characteristic, and the media B are an example of the media having a desired characteristic.

As shown in FIGS. 7A and 7B, since the recording media B have a large recording power area showing a small jitter value, they have the wide recording margin with respect to the recording power and the small variations of the jitter and the asymmetry at the inner circumferential position, the intermediate circumferential position and the outer circumferential position of the recording media. Normally, the optical disc has a recording sensitivity difference (also referred to as "on-surface recording sensitivity difference") at the positions from the inner circumference to the outer circumference on the recording surface. Generally, though the recording sensitivity tends to be low at the outer circumferential position, the media B have the small difference of the recording quality of the RF signal by the on-surface recording sensitivity difference.

On the other hand, as shown in FIGS. 6A and 6B, the media A have a narrow recording margin with respect to the recording power, and large deterioration of the recording quality caused due to the on-surface recording sensitivity difference of the media. Therefore, even though the optimum recording power is determined by the test writing with using the above-mentioned special OPC strategy and the recording of the actual data is performed with the recording power, the recording margin is narrow, and the optimum recording power obtained by the test writing may be shifted with respect to the optimum recording power at the time of the actual recording due to the deterioration of the recording quality at the inner and outer circumferential positions of the disc.

In this view, in the present invention, the optimum recording power is determined at the time of the test writing, and by using it, the recording of the actual data is started. Then, the recording is temporarily stopped, and the recording quality of the recording data is confirmed. Afterward, the correction of the recording power is performed as the need arises. Namely, during the actual recording, the recording power is confirmed and corrected, as the need arises. Thereby, as for the media having the undesired recording characteristic, like the above-mentioned media A, the deterioration of the recording quality is prevented. At the same time, as for the media having the desired recording characteristic, like the media B, the stable recording quality is realized.

Figure 8:
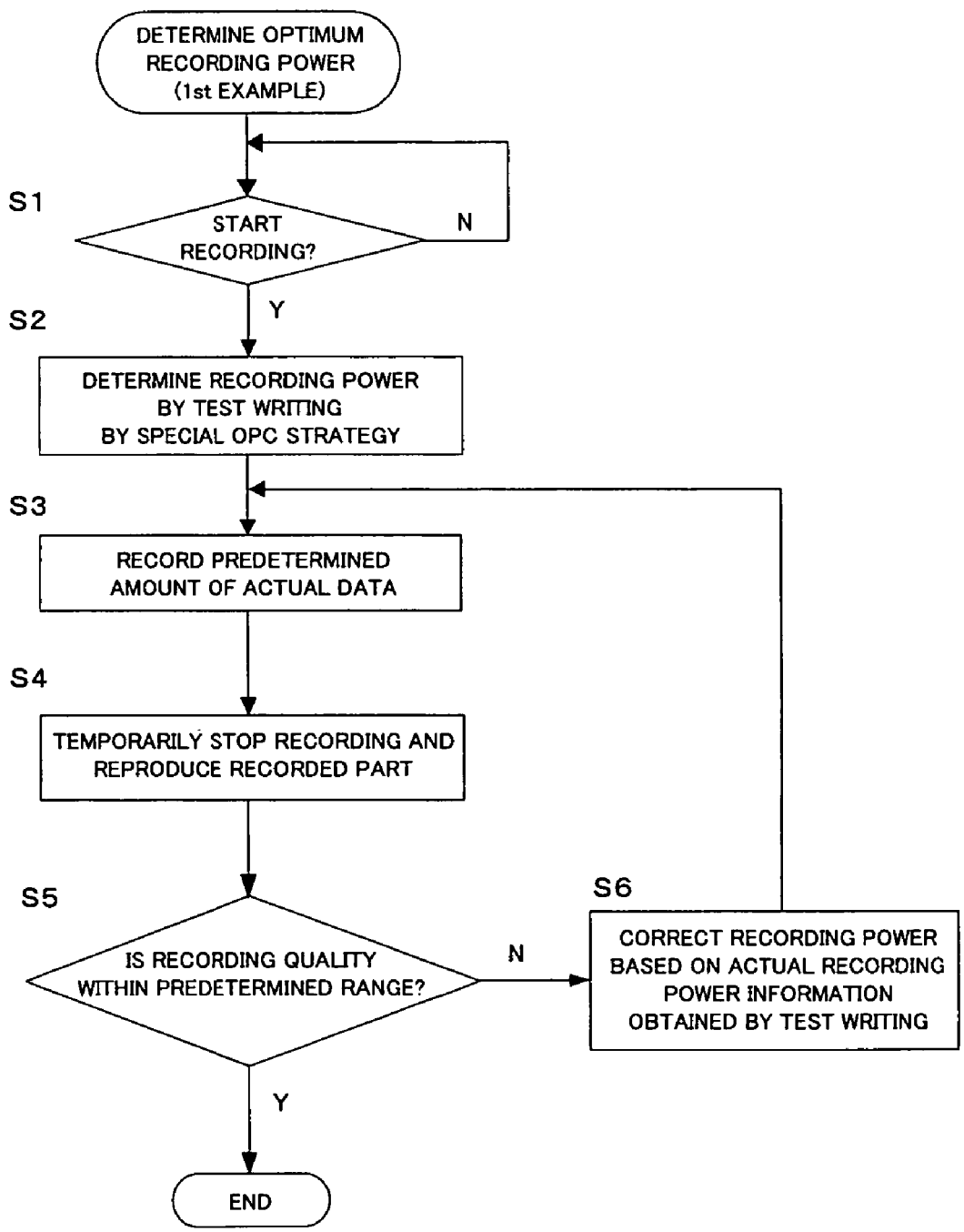
FIG. 8 is a flow chart of a first example of an optimum recording power determination process according to the present invention.

Next, a description will be given of a first example of the optimum recording power determination process according to the present invention. FIG. 8 is a flow chart of the first example of the optimum recording power determination process. This process is realized when the CPU 354 shown in FIG. 2 executes the program of the optimum recording power determination process stored in the memory 355 or other memory to control each of the components shown in FIG. 2.

First, the CPU 354 determines whether or not a recording start instruction is inputted by the user (step S1). When the recording start instruction is inputted (step S1; Yes), the CPU 354 executes the test writing in the PCA 107 with using the above-mentioned special OPC strategy to determine the recording power (step S2). By the test writing, the CPU 354 obtains the actual recording power information showing the relation between the recording power and the recording quality evaluation parameter (asymmetry, β value or modulation degree). The test writing (OPC) with using the special OPC strategy will be described in detail, later.

When the test writing ends, the CPU 354 starts the actual recording, i.e., the recording of the actual data such as the user data in the data recording area 106. After recording the predetermined amount of actual data (step S3), the CPU 354 temporarily stops the recording and reproduces the recorded actual data (step S4).

The data of "predetermined amount" is the minimum data amount within a range necessary for the calculation of the recording quality evaluation parameter, such as the asymmetry, based on the reproduction RF signal of the recording data. Namely, though the data amount is necessary to some extent in order to determine the recording quality, since the actual data is recorded, the recording power is confirmed and corrected within the minimum data amount. Actually, when the recording is temporarily stopped, since track jump is repeated at the position, the predetermined amount can be the data amount corresponding to 1 track, for example. In addition, so as to remove an influence of crosstalk from the adjacent tracks at the time of the track jump, the predetermined amount may be the data amount of 3 tracks, at the intermediate of which the track jump may be repeated.

In step S4, the CPU 354 reproduces the recorded actual data, and calculates the quality evaluation parameter such as the asymmetry, based on the reproduction RF signal. Then, the CPU 354 determines whether or not the recording quality is within the predetermined range, based on the calculated quality evaluation parameter (step S5).

The determination whether or not the recording quality is within the predetermined range is concretely executed as follows. When the asymmetry or the β value is used as the quality evaluation parameter, it can be determined that the recording quality is within the predetermined range, in such a case that the value is within the range of 5% pp (peak to peak) from 0% as the center, for example. Additionally, based on the range of the desired asymmetry in a standard of the DVD-R, when the asymmetry or the β value is within the range of 0% to 10%, it can be determined that the recording quality is within the predetermined range. When the asymmetry or the β value is within substantially 50% of the asymmetry margin of the media used for the recording, it can be also determined that the recording quality is within the predetermined range. In such a case that the modulation degree is used as the recording quality evaluation parameter, it can be determined that the recording quality is within the predetermined range, when the modulation degree obtained from the reproduction RF signal is within the predetermined range (e.g., substantially 2.5%) with respect to the predetermined target modulation degree value.

When it is determined that the recording quality is not within the predetermined range by any one of the above-mentioned standards, the CPU 354 corrects the recording power based on the actual recording power information obtained by the test writing (step S6). Now, it is assumed that the characteristic (OPC graph) between the recording power and the asymmetry shown in FIG. 5B is obtained as the actual recording power information at the time of the test writing. Then, the CPU 354 refers to the characteristic and determines the correction amount of recording power. For example, the CPU 354 corrects the current recording power based on the characteristic so that the asymmetry becomes 0%.

Then, the CPU 354 returns to step S3 and repeats the steps S3 to S5 again. In this manner, when it is determined that the recording quality is within the predetermined range in step S5, the optimum recording power determination process ends. Afterward, by the recording power determined (i.e., after the necessary correction) by the optimum recording power determination process, the recording of the actual data is continued.

In the present invention, after the recording of the actual data is started with the recording power obtained in the test writing, the recording is temporarily stopped when the predetermined amount of actual data is recorded, and the recording quality is confirmed. When the recording quality is not within the predetermined range, the recording power is corrected. Therefore, the optimum recording power can be determined with high accuracy for the media having the small recording power margin and the media having the large on-surface recording sensitivity difference, and such a probability that the RF signal quality becomes out of the power margin after the start of the actual recording can be reduced. Additionally, since the correction of the recording power is executed based on the actual recording power information, having the characteristic equivalent to that at the time of the actual recording, obtained by the test writing with using the special OPC strategy, the optimum recording power can be determined with high accuracy.

Next, a description will be given of a second example of the optimum recording power determination process. In the above-mentioned process, while the recording power is confirmed and corrected immediately after the start of the actual recording, the recording power is not confirmed and corrected during the subsequent actual recording. However, as described above, since the on-surface recording sensitivity difference exists depending on the recording position (inner circumference, intermediate circumference and outer circumference) on the recording surface of some recording media, the optimum recording power may be different according to the recording positions. When the actual recording is continued, the temperature of the laser diode (LD) being the light source of the laser light becomes high, and the recording waveform is varied. As a result, the optimum recording power can be varied. Therefore, in the second example described below, the recording power is confirmed immediately after starting the actual recording in the second example explained below, similarly to the first example, and additionally the recording power is also confirmed at the time when the predetermined amount of data is recorded and/or at the time when temperature variation becomes equal to or larger than the predetermined value.

Figure 9:
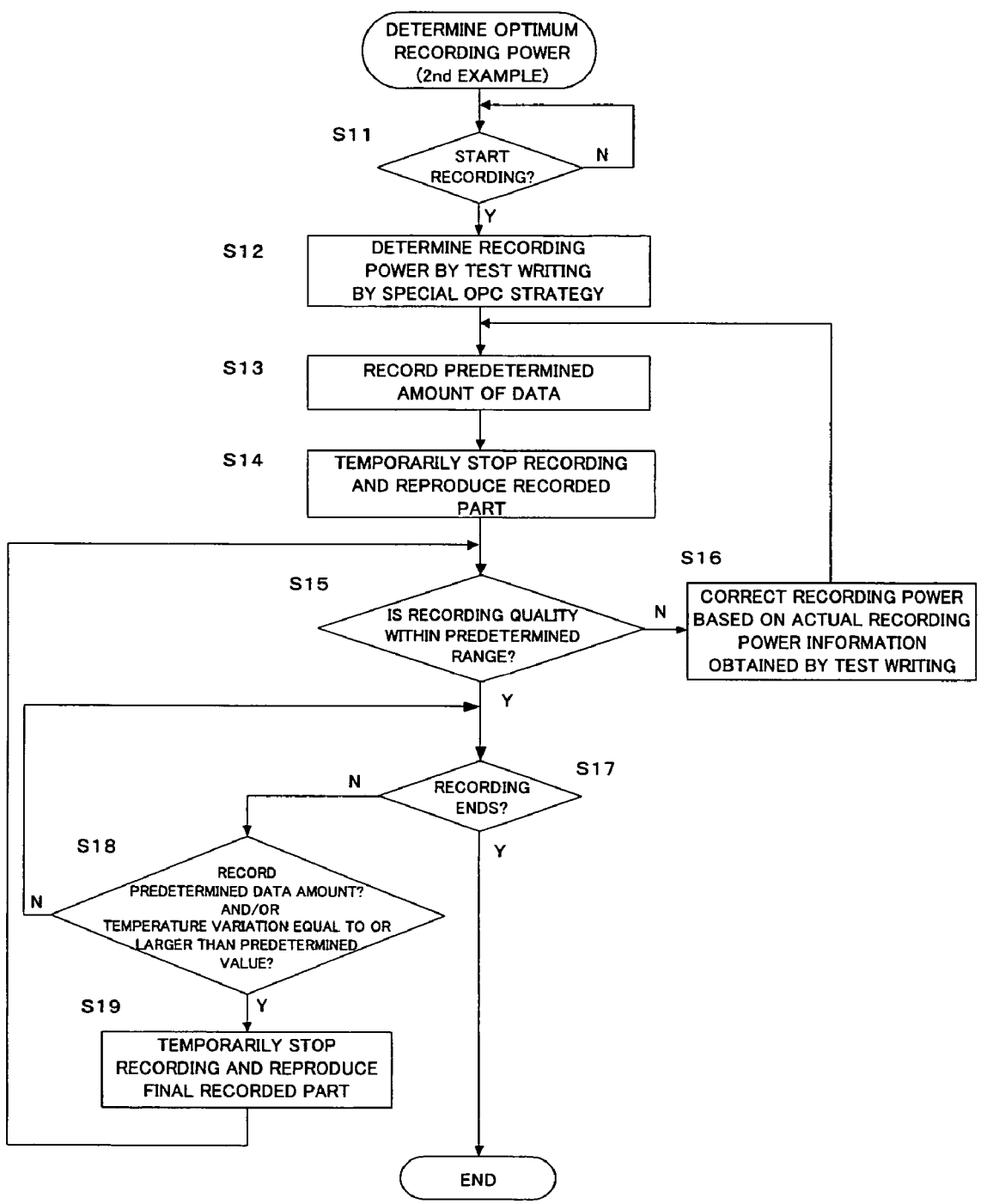
FIG. 9 is a flow chart of a second example of the optimum recording power determination process according to the present invention.

FIG. 9 shows a flow chart of the second example of the optimum recording power determination process. Since steps S11-S16 are same as steps S1-S6 of the first example shown in FIG. 8, explanations thereof are omitted. In step S15, when the confirmation of the recording power immediately after the start of the actual recording is completed, the CPU 354 determines whether or not to end the recording (step S17). This can be executed by determining whether or not all of the actual data instructed by the user is recorded, for example.

When the actual data to be recorded remains, the CPU 354 determines whether or not the predetermined amount of data is recorded and/or whether or not the temperature variation from the start time of the recording is equal to or larger than the predetermined value (step S18). One or both of the above determination may be employed.

"Predetermined amount of data" in this case is amount of data with which the recording position on the optical disc moves to such an extent that the on-surface recording sensibility difference for each media occurs. For example, as described above, the optical disc is classified into the inner circumferential position, the intermediate circumferential position and the outer circumferential position, and the predetermined amount of data can be determined so that the confirmation of the recording power in step S15 is executed at each of those positions. Since the on-surface recording sensitivity difference of the optical disc normally tends to become larger in the more outer circumference, the number of confirmation may be increased and/or the confirmation step may be shortened at the outer circumferential position, after the recording power is confirmed at the inner circumferential position and the intermediate circumferential position. For example, in a case of the optical disc having the diameter of 12 cm, the predetermined amount of data may be determined so that, on the inner circumferential side with respect to the position of 55 mm from the center, corresponding to the outer circumferential position, the recording power is confirmed for each 10 mm, and on the outer circumferential side thereof, the recording power is confirmed for each 1 mm.

In addition, "predetermined temperature variation" can be set to a temperature variation at which a variation occurs to the output power of the LD being the light source. The temperature variation can be calculated based on the output from the temperature sensor arranged in the vicinity of the LD in the pickup. Concretely, the temperature of the LD at the time of starting the recording is detected and stored as the initial temperature. When the temperature variation equal to or larger than the predetermined value with respect to the initial temperature happens, the recording power confirmation of step S15 is performed. Afterward, every time the temperature variation equal to or larger than the predetermined value happens, the recording power confirmation may be performed.

In step S18, when it is determined that the predetermined amount of data is recorded and/or the temperature variation equal to or larger than the predetermined value is detected, similarly to step S14, the CPU 354 temporarily stops the recording and reproduces the final recorded part at this time (step S19). Then, the process goes to step S15, and it is determined whether or not the recording quality is within the predetermined range. In this manner, during the actual recording, when the predetermined amount of data is recorded, and/or when the temperature variation equal to or larger than the predetermined value is detected, the recording power confirmation and the necessary correction are performed. When the entire actual data is recorded (step S17; Yes), the process ends.

In this manner, by the second example of the optimum recording power determination process, the recording power confirmation and the necessary correction are repeatedly performed at the timing at which the variation cause of the optimum recording power can occur not only immediately after the start of the actual recording but also during the continuing actual recording. Therefore, the characteristic difference of the LD being the light source, the temperature variation, the environmental variation, the difference of the recording quality between the recording apparatuses (drive apparatuses), and the difference of the recording characteristic of the recording media can be absorbed, and the recording can be always performed at the optimum recording power.

[Test Writing (OPC Process) by Special OPC Strategy]

Next, a description will be given of the test writing (OPC process) by the special OPC strategy, which is executed in steps S2 and S12 of the above-mentioned optimum recording power determination process. The test writing by the special OPC strategy is characterized in that the test writing is also performed at the substantially same recording power as that at the actual recording time even at the liner speed different from that at the actual recording time. Thereby, it becomes possible to obtain the relation between the recording power used at the time of the actual recoding and the recording quality evaluation parameter, i.e., the actual recording power information.

In the explanation described below, by prescribing a constant x as a predetermined reference value, the recording speed of the data onto the optical disc is shown by 4x, 6x and 8x. Namely, it is shown that the recording speed shown by 8x becomes substantially twice of the recording speed shown by 4x. The value "x" being the reference value may be determined by the standards of the drive and the optical disc, or may be optionally determined by a manufacturer of the information recording and reproduction apparatus. In the following explanation, the description will be given under condition that there are recording speeds of three kinds (i.e., 4x, 6x and 8x) of the optical disc 100. One concrete example of "first recording speed" in the present invention corresponds to "recording speed of 4x" or "recording speed of 6x", and one concrete example of "second recording speed" in the present invention corresponds to "recording speed of 8x" in this embodiment.

Now, a description will be briefly given of various kinds of strategies used a lot in the following explanation. "Recording strategy for lx (l=4, 6, 8)" is strategy information used for controlling the waveform of the laser beam for the purpose of recording of various kinds of data including the normal contents at the recording speed of lx. Namely, it corresponds to the one concrete example of "recording strategy" in the present invention.

"Special OPC strategy for mx (m=4 and 6)" is strategy information used for controlling the waveform of the laser beam at the time of recording the OPC pattern at the recording speed of mx, in order to calculate the optimum recording power at the recording speed of 8x. Namely, it corresponds to the one concrete example of "special OPC strategy" in the present invention.

"Ordinary OPC strategy for nx (n=4 and 6)" is strategy information used for controlling the waveform of the laser beam at the time of recording the OPC pattern at the recording speed of nx, in order to calculate the optimum recording power at the recording speed of nx. Namely, it corresponds to one concrete example of "ordinary OPC strategy" in the present invention.

In this embodiment, particularly, as shown at the low part of FIG. 1, the strategy recording area 103 being one concrete example of "control area" in the present invention is provided in the lead-in area 104. The recording strategy for 8x and the special OPC strategy for 4x (or the special OPC strategy for 6x) are recorded in the strategy recording area 103. The recording strategy for 8x is the control information to control the waveform of the laser beam for recording the data at the recording speed of 8x. The special OPC strategy for 4x is the control information for controlling the waveform of the laser beam at the time of recording the OPC pattern at the recording speed of 4x, in order to calculate the optimum recording power at the recording speed of 8x. The special OPC strategy for 6x is the control information for controlling the waveform of the laser beam at the time of recording the OPC pattern at the recording speed of 6x, in order to calculate the optimum recording power at the recording speed of 8x.

In addition, the recording strategy for 4x, for controlling of the waveform of the laser beam for recording the data at the recording speed of 4x, and the recording strategy for 6x, for controlling of the waveform of the laser beam for recording the data at the recording speed of 6x, are further recorded therein. Further, the ordinary OPC strategy for 4x, for controlling the waveform of the laser beam at the time of recording the OPC pattern at the recording speed of 4x, is recorded therein, in order to calculate the optimum recording power at the recording speed of 4x. The ordinary OPC strategy for 6x, for controlling the waveform of the laser beam at the time of recording of the OPC pattern at the recording speed of 6x, is also recorded therein, in order to calculate the optimum recording power at the recording speed of 6x.

The above strategies may be recorded by land prepits (LPP) formed on the land track, or may be recorded as data (or file). Particularly, if the strategies are recorded as the data, it advantageously becomes possible to suitably re-record the strategies. The strategy recording area 103 may be provided in the data recording area 106 or the lead-out area 108, not in the lead-in area 104.

Figure 10:
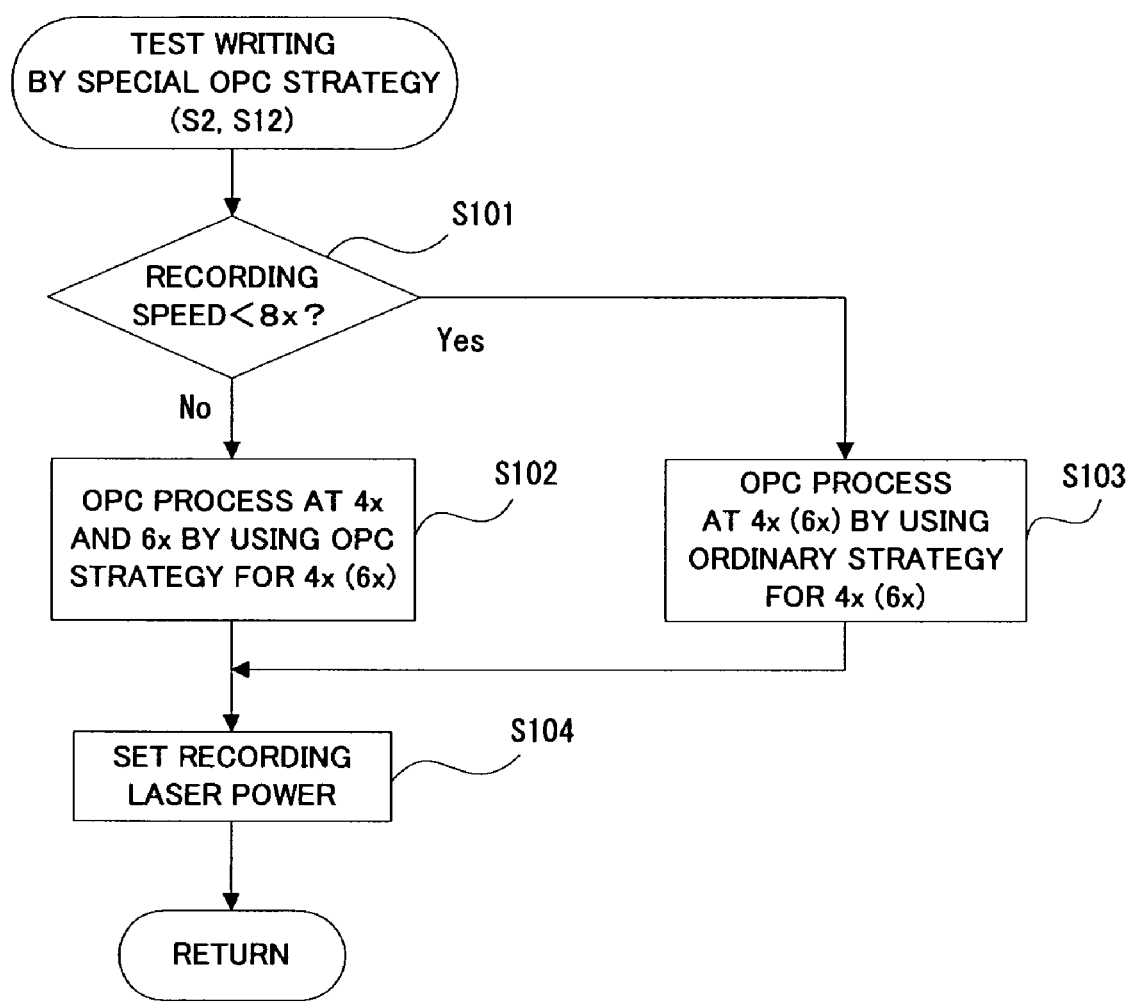
FIG. 10 is a flow chart showing a flow of basic operation of the information recording and reproduction apparatus according to this embodiment.
Figure 11:
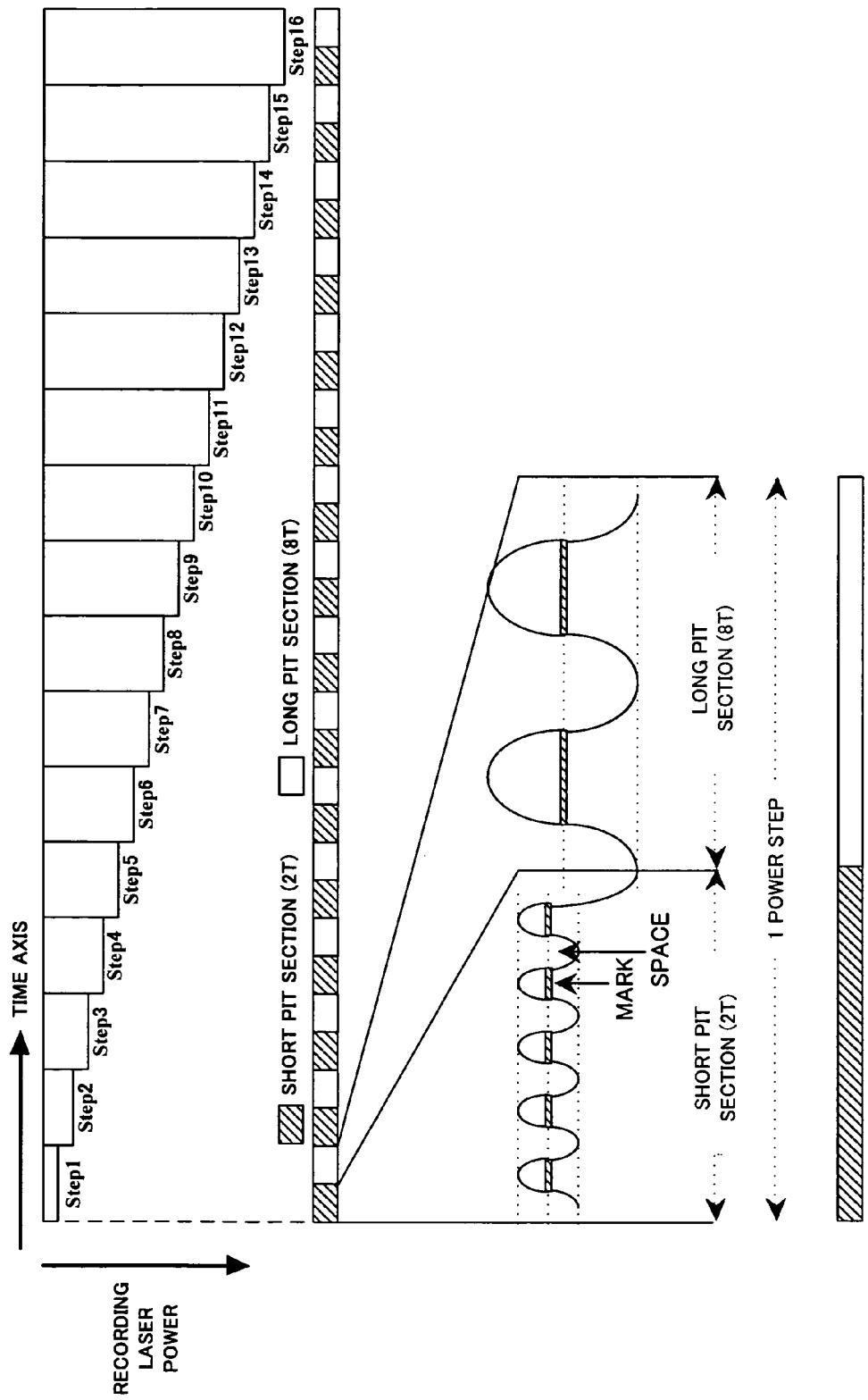
FIG. 11 is a schematic timing chart view showing one OPC process in a case of 16 power steps in the information recording and reproduction apparatus according to this embodiment.

Subsequently, a description will be given of the basic operation of the information recording apparatus according to this embodiment, with reference to FIG. 10 and FIG. 11. FIG. 10 is a flow chart showing the flow of the basic operation of the information recording apparatus according to this embodiment, and FIG. 11 is a schematic timing chart view showing one OPC process in a case of 16 power steps.

As shown in FIG. 10, under control of the CPU 354, it is determined whether or not the recording speed of the data onto the optical disc 100 is smaller than 8x (step S101). At this time, it is preferably determinable what numeric value the recording speed concretely indicates.

As a result of the determination, when the recording speed is determined to be smaller than 8x (i.e., 4x or 6x) (step S101: Yes), the optimum recording power corresponding to each of the recording speeds is calculated by the OPC process. Specifically, when the recording speed is determined 4x, the OPC process is executed by rotating the optical disc 100 and using the ordinary OPC strategy for 4x, in order to realize the recording speed of 4x, for example. When the recording speed is determined 6x, the OPC process is executed by rotating the optical disc 100 and using the ordinary OPC strategy for 6x, in order to realize the recording speed of 6x.

The ordinary OPC strategy for 4x (or the ordinary OPC strategy for 6x) may be obtained from the strategy recording area 103 in the lead-in area 104, or may be obtained from the memory 355 included in the information recording and reproduction apparatus 300.

Now, a detailed description will be given to the OPC process. First, under control of the CPU 354, the optical pickup 352 is moved to the OPC area, such as the PCA 107, provided in the lead-in area 104, and by the operation of the OPC pattern generator 358 and the LD driver 359, the recording laser power is gradually (e.g., 16 steps mutually different from each other) switched in order, and the OPC pattern is recorded in the OPC area. Concretely, the reference OPC pattern shown in FIG. 11 is recorded. As an example, there is a recording pattern in which a short pit (mark) corresponding to 2T pulse and a long pit (mark) corresponding to 8T pulse are alternately formed with anon-recording section (space) having the same length, respectively, for example. In this embodiment, the waveform prescribed by the ordinary OPC strategy for 4x (or the ordinary OPC strategy for 6x) is used as the waveform of the laser beam at this time, and a predetermined OPC pattern different from the reference pattern is recorded. In addition, in step S102, the waveform prescribed by the special OPC strategy for 4x (or the special OPC strategy for 6x) is used, and a predetermined OPC pattern different from the reference pattern is recorded.

The LD driver 358 drives a semiconductor laser in the optical pickup 352 by the OPC pattern outputted from the OPC pattern generator 359 so that the laser power is gradually switched in order.

Further, after the test writing in the OPC area is completed, the OPC pattern test-written in the OPC area is reproduced under control of the CPU 354. Concretely, from the RF signal inputted to an envelope detector (not shown), the peak value and the bottom value of the detected envelope of the RF signal are sampled. Afterward, the reproduction of the OPC pattern is performed in one-time OPC process in correspondence to the number of recorded OPC patterns, and the optimum recording power is determined. Namely, from the asymmetry obtained from the peak value and the bottom value, the optimum recording power is calculated so that the jitter value showing the quality of the recording characteristic becomes the substantial minimum, for example.

On the other hand, when, as a result of the determination in step S101, it is determined that the recording speed is not smaller than 8x (i.e., the recording speed is 8x) (step S101: No), the OPC process is executed by using the special OPC strategy for 4x and the special OPC strategy for 6x. By the operation of the CPU 354 being one concrete example of "power calculation unit" in the present invention, the optimum recording power at the recording speed of 8x is calculated (step S102). The special OPC strategy for 4x and the special OPC strategy for 6x may be obtained from the strategy recording area 103 of the optical disc 100, or may be obtained from the memory 355 if the strategy is recorded therein, under control of the CPU 354 being one concrete example of "obtaining unit" in the present invention.

Figure 12A:
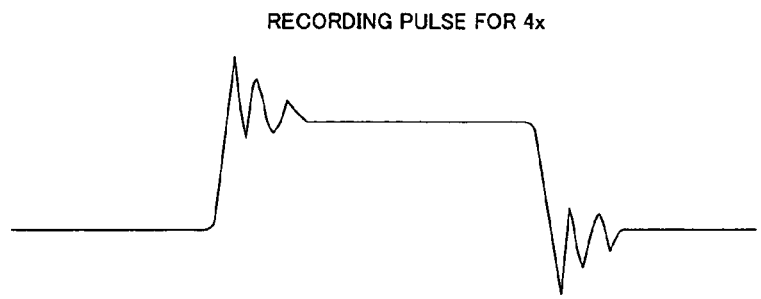
FIGS. 12A to 12C are explanation views showing a pulse waveform of a laser beam irradiated from an optical pickup in the information recording and reproduction apparatus.
Figure 12B:
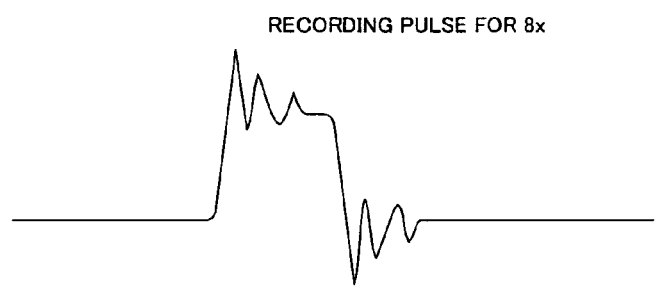
Figure 12C:
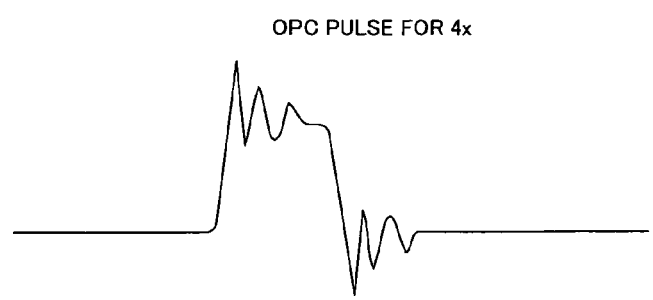
Figure 13A:
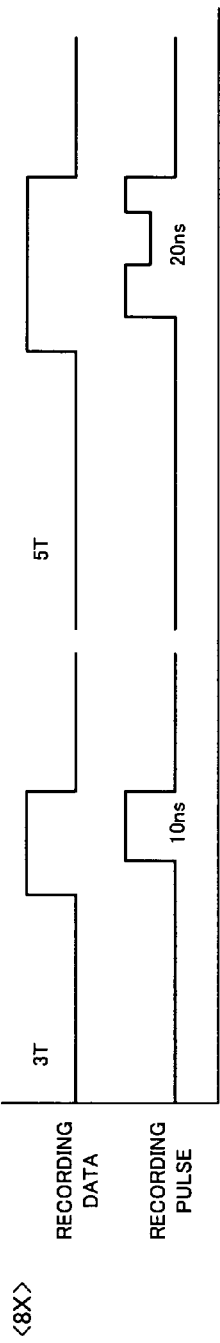
FIGS. 13A to 13C are explanation views showing the pulse waveform of a laser beam corresponding to each strategy used by the information recording and reproduction apparatus.
Figure 13B:
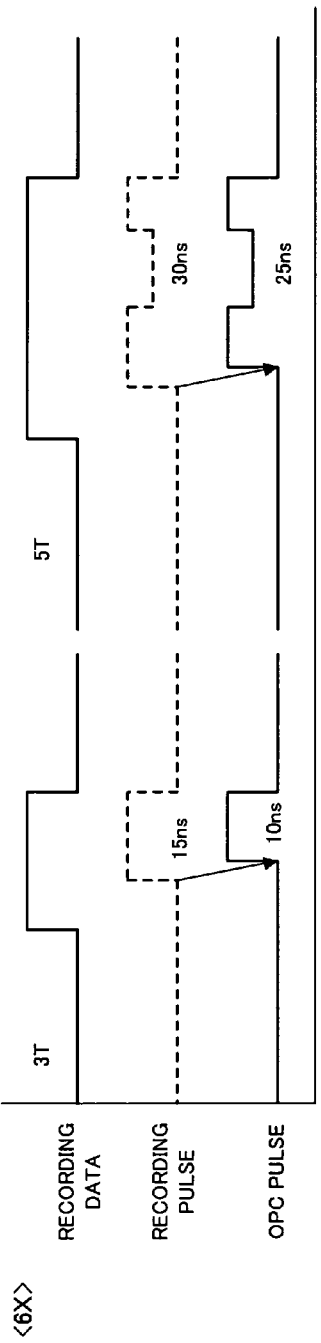
Figure 13C:
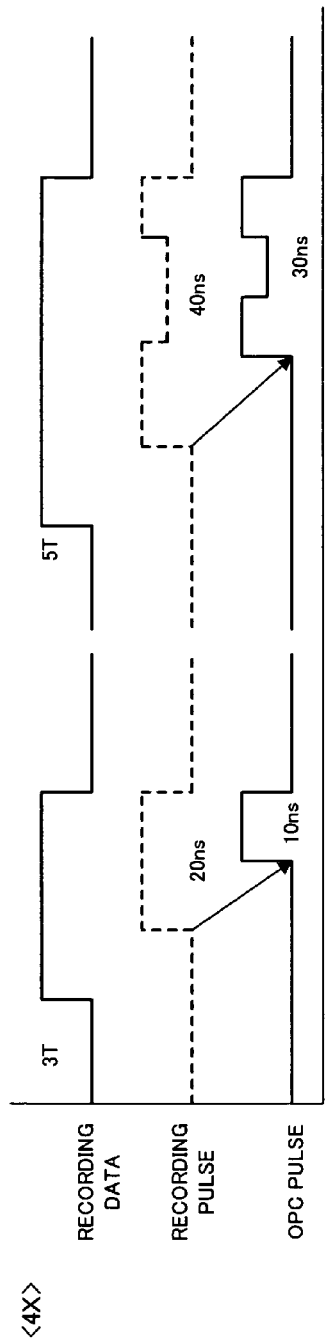

Now, the detailed description will be given of the various kinds of strategies used for the operation so far and the waveform of the laser beam prescribed by the strategies, with reference to FIGS. 12A to 12C and FIGS. 13A to 13C. FIGS. 12A to 12C are illustrations showing the pulse waveforms of the laser beam irradiated from the optical pickup, and FIGS. 13A to 13C are illustrations showing the pulse waveforms of the laser beam corresponding to each of the strategies.

First, with reference to FIGS. 12A to 12C, a description will be given of the waveform pulse of the laser beam irradiated by the special OPC strategy for 4x used for the OPC process, and the waveform pulse of the laser beam irradiated by the recording strategy for 4x and the recording strategy for 8x used for the normal recording operation, as a comparative example thereof.

As shown in FIG. 12A, the waveform of the laser beam prescribed by the recording strategy for 4x has the waveform whose rise-up and fall-down of the pulse vibrate. The waveform whose rise-up and fall-down vibrate is caused due to the difference of the characteristic of the information recording and reproduction apparatus 300, the deterioration by the secular change of the optical pickup 352 and the difference of the emission power of the laser beam. The information recording and reproduction apparatus 300 can record the predetermined data onto the optical disc 100 at the recording speed of 4x by using the waveform of the laser beam shown in FIG. 12A.

Meanwhile, the pulse waveform of the laser beam prescribed by the recording strategy for 8x shown in FIG. 12B is used so that the same data as that recorded by using the pulse shown in FIG. 12A is recorded onto the optical disc 100 at the recording speed of 8x. The pulse shown in FIG. 12B is the waveform of the half of the pulse shown in FIG. 12A on the time axis. Since the recording speed of 8x becomes substantially twice of that of 4x, similarly the rotation speed (or, the linear speed in the predetermined recording area) of the optical disc for the recording speed of 8x becomes substantially twice of that of the recording speed of 4x. Therefore, the irradiation period of the laser beam necessary for forming the same pit is substantially half.

Similarly, the recording strategy for 6x, used for recording the data at the recording speed of 6x (not shown), has the waveform whose pulse width is shorter than that shown in FIG. 12A and longer than that shown in FIG. 12B. The information recording apparatus 300 records the data at the recording speed of 4x, 6x or 8x by using the laser beam prescribed by each of the various kinds of recording strategies. In addition, if the OPC pattern is recorded by using the laser beam prescribed by the ordinary OPC strategy for 4x, the optimum recording power at the recording speed of 4x is calculated. By recording the OPC pattern with using the laser beam prescribed by the ordinary OPC strategy for 6x (not shown), the optimum recording power at the recording speed of 6x is calculated.

On the other hand, when the optimum recording power at the recording speed of 8x is calculated, the information recording apparatus 300 according to this embodiment does not have to record the OPC pattern by using the laser beam prescribed by the recording strategy for 8x shown in FIG. 12B. In this embodiment, when the optimum recording power at the recording speed of 8x is calculated, the OPC pattern is recorded at the recording speed of 4x by using the pulse waveform of the laser beam prescribed by the special OPC strategy for 4x shown in FIG. 12C. Namely, by using the pulse waveform whose pulse width becomes shorter than that of the original recording strategy for 4x (or whose shape is substantially same as the recording strategy for 8x), the OPC process is executed.

The detailed description will be given of the pulse waveform used for the OPC process, i.e., the special OPC strategy for 4x and the special OPC strategy for 6x, with reference to FIGS. 13A to 13C.

As shown by the graph on the left side of FIG. 13A, when the data of "3T pattern" is recorded onto the optical disc 100 at the recording speed of 8x, the laser beam corresponding to 10 ns pulse is irradiated. In addition, when the data of "5T pattern" is recorded, the laser beam corresponding to the 20 ns pulse shown by the graph on the right side of FIG. 13A is irradiated. The shapes of the pulses are prescribed based on the recording strategy for 8x under control of the CPU 354, for example.

As shown by the graph at the middle part on the left side of FIG. 13B, when the data of "3T pattern" is recorded onto the optical disc 100 at the recording speed of 6x, the laser beam corresponding to 15 ns pulse is irradiated. In addition, when the data of "5T pattern" is recorded, the laser beam corresponding to the 30 ns pulse shown in the graph at the middle part on the right side of FIG. 13B is irradiated. The shapes of the pulses are prescribed based on the recording strategy for 6x under control of the CPU 354, for example.

Meanwhile, in order to calculate the optimum recording power at the recording speed of 8x, when the OPC pattern of "3T pattern" is recorded at the recording speed of 6x, as shown at the bottom part on the left side of FIG. 13B, the laser beam corresponding to 10 ns pulse is irradiated based on the special OPC strategy for 6x. Namely, the pulse having the same shape as that of the pulse used at the time of recording of the "3T pattern" at the recording speed of 8x is irradiated. Meanwhile, when the OPC pattern of "5T pattern" is recorded at the recording speed of 6x, the laser beam corresponding to the 25 ns pulse shown at the bottom part on the right side of FIG. 13B is irradiated. The pulse width at this time is longer than that at the time of recording the data of "5T pattern" at the recording speed of 8x.

As shown in the graph at the middle part on the left side of FIG. 13C, when the data of "3T pattern" is recorded onto the optical disc 100 at the recording speed of 4x, the laser beam corresponding to the 20 ns pulse is irradiated. In addition, when the data of "5T pattern" is recorded, the laser beam corresponding to the 40 ns pulse shown in the graph at the middle part on the right side of FIG. 13C is irradiated. The shapes of the pulses are prescribed based on the recording strategy for 4x under condition of the CPU 354, for example.

Meanwhile, when the OPC pattern of "3T pattern" is recorded at the recording speed of 4x in order to calculate the optimum recording power at the recording speed of 8x, as shown at the bottom part on the left side in FIG. 13C, the laser beam corresponding to the 10 ns pulse is irradiated based on the special OPC strategy for 4x. Namely, the pulse having the same shape as that of the pulse used at the time of the recording of "3T pattern" at the recording speed of 8x is irradiated. Meanwhile, when the OPC pattern of "5T pattern" is recorded at the recording speed of 4x, the laser beam corresponding to the pulse of 30 ns shown at the bottom part on the right side in FIG. 13C is irradiated. The pulse width at this time is longer than that at the time of the recording of "5T pattern" at the recording speed of 8x.

As described above, when the optimum recording power at the recording speed of 8x is calculated by using the special OPC strategy for 4x and the special OPC strategy for 6x, by irradiating the laser beam of the pulse shorter than that of the laser beam prescribed by the recording strategy for 4x or the recording strategy for 6x used at the time of originally recording of the data, the OPC pattern is recorded. More specifically, by the special OPC strategy for 6x, the width of the pulse for recording the data of "3T pattern" is shortened from 15 ns to 10 ns (i.e., substantially 67%). Additionally, the width of the pulse for recording the data of "5T pattern" is shortened from 30 ns to 25 ns (i.e., substantially 83%). Meanwhile, by the special OPC strategy for 4x, the width of the pulse for recording the data of "3T pattern" is shortened from 20 ns to 10 ns (i.e., substantially 50%). Moreover, the width of the pulse for recording the data of "5T pattern" is shortened from 40 ns to 30 ns (i.e., substantially 75%).

Namely, in any case, based on the special OPC strategy, the pulse width is varied to become closer to the pulse width prescribed by the recording strategy for 8x than the pulse width prescribed by the recording strategy used at the time of original recording of the data. Particularly, the laser beam having the same pulse width as that originally used at the time of the recording of the data at the recording speed of 8x is irradiated for the data of "3T pattern" being the short pattern. More specifically, the special OPC strategy for 4x and the special OPC strategy for 6x are prescribed so that the data having the relatively short pattern (e.g., "3T pattern") is varied to become relatively shorter and the data having the relatively long pattern (e.g., "11T pattern") is varied not to become shorter than the variation of the data having the relatively short pattern.

In this manner, by using the special OPC strategy for 4x and the special OPC strategy for 6x, the same or substantially same pulse shape as the pulse shape prescribed by the recording strategy for 8x or the pulse width close thereto is used, and the OPC pattern can be recorded at the recording speed for 4x and 6x. At this time, it is preferable that the magnitude of the waveform of the laser beam prescribed by the recording strategy for 8x shown in FIG. 13A are same or substantially same as the magnitudes of the waveforms of the laser beams prescribed by the special OPC strategy for 4x and the special OPC strategy for 6x shown in FIGS. 13B and 13C. Namely, it is preferable that the OPC process is actually executed by the same or substantially same laser power as that at the time of the recording of the data at the recording speed of 8x.

Figure 14A:
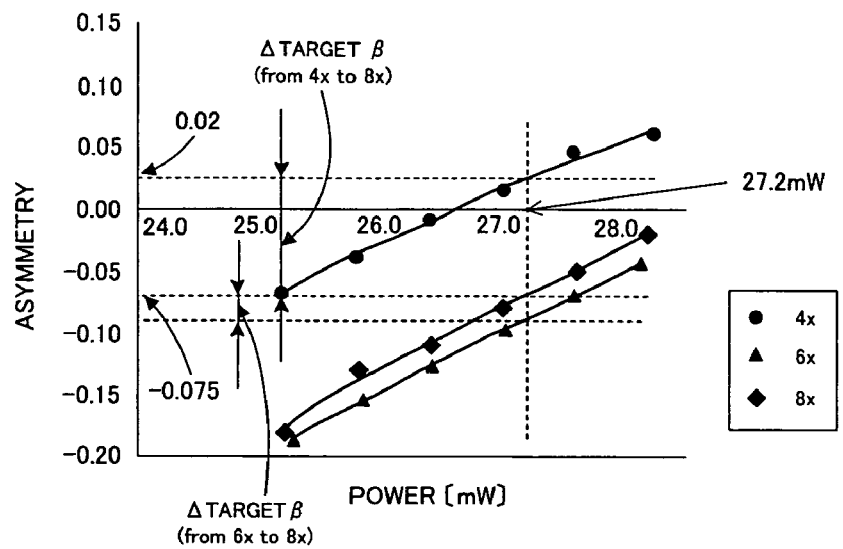
FIGS. 14A and 14B are graphs showing data obtained as a result of the OPC process executed by using special OPC strategy in the information recording and reproduction apparatus.
Figure 14B:
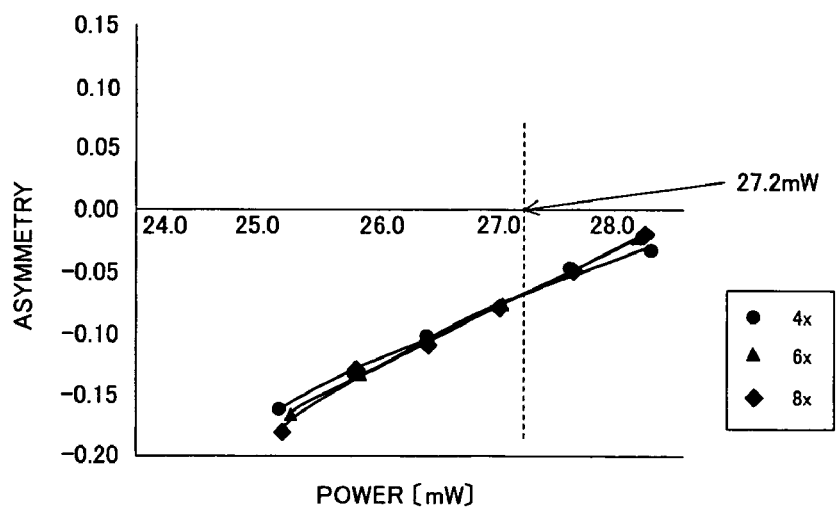

Now, a description will be given of a result of executing of the OPC process by using the special OPC strategy for 4x and the special OPC strategy for 6x, with reference to FIGS. 14A and 14B. FIGS. 14A and 14B are graphs showing data obtained as a result of the OPC process.

In FIG. 14A, there are shown the graphs of the results of executing the OPC by using the special OPC strategy for 4x at the recording speed of 4x and the special OPC strategy for 6x at the recording speed of 6x, respectively.

As described above, the data having the relatively short pattern is varied to become relatively shorter, and the data having the relatively long pattern is varied not to become shorter than the variation of the data having the relatively short pattern. Thereby, the graphs showing the results of the OPC using the special OPC strategy for 4x and the special OPC strategy for 6x are shifted to the right side of the drawing, with respect to the power axis. That is, the result of the OPC can be obtained in the area having the substantially same level as that of the actual emission power of the optimum recording power at the recording speed of 8x.

Now, a target asymmetry value "target $\beta$" is set in order to obtain the optimum recording laser power at the recording speed of 8x. The target $\beta$ is an asymmetry value for realizing the optimum recording power (particularly, the laser power actually emitted) at the recording speed of 8x.

An explanation will be given by using concrete numeral values. When the target $\beta$ of the optimum recording power at the recording speed of 8x is set to "−0.075", the target $\beta$ at the recording speed of 4x becomes "0.02", and the target at the recording speed of 6x becomes "−0.1", according to the graph shown in FIG. 14A. Therefore, by the graph shown in FIG. 14A, the optimum recording power at the recording speed of 8x can be calculated as "27.2 mW" which realizes the target $\beta$="0.02" at the recording speed of 4x and the target $\beta$="−0.1" at the recording speed of 6x.

In this manner, by using the special OPC strategy for 4x and the special OPC strategy for 6x, prescribing the pulse width having the substantially same level as that of the recording strategy for 8x, the OPC process can be executed with the laser power having the substantially same level as that of the actual emission power at the recording speed of 8x and with the laser beam having the pulse width of the same level. Thus, it becomes possible to reduce or remove the error of the optimum recording power due to the characteristic variation between the current value inputted to the optical pickup 352 and the power of the laser beam actually emitted from the optical pickup 352. As a result, by recording the OPC pattern at the recording speeds of 4x and 6x, the optimum recording power at the recording speed of 8x can be appropriately calculated with high accuracy.

Particularly, even if the information recording apparatus 300 executing the OPC process is changed, even if the OPC process is executed by the different emission power, or even if the secure change of the optical pickup 352 occurs, the value of the target $\beta$ can be the same by executing the OPC process with using the special OPC strategy for 4x and the special OPC strategy for 6x. In addition, Δtarget $\beta$ (from 4x to 8x) being the difference between the targets $\beta$ at the recording speeds of 4x and 8x, and Δtarget $\beta$ (from 6x to 8x) being the difference between the targets $\beta$ at the recording speeds of 6x and 8x can be set to "0". This shows such a remarkable advantage that the optimum recording power at the recording speed of 8x can be appropriately calculated without depending on the drive.

By adjusting (i.e., varying the pulse width of the laser beam) the special OPC strategy for 4x and the special OPC strategy for 6x, the OPC process can be executed so that the results of the OPCs at the recording speed of 4x and at the recording speed of 6x substantially become same, as shown in FIG. 14B. Namely, the OPC process can be executed so that the respective graphs cross in the optimum recording power at the recording speed of 8x. That is, the above-mentioned value of Δtarget $\beta$ is variable by adjusting the special OPC strategy.

Not by the method explained in this embodiment, the OPC process is executed with using the recording strategy for 4x and the recording strategy for 6x without using the OPC strategy, and based on a result thus obtained, the optimum recording power at the recording speed of 8x can be calculated. However, in this case, since the recording strategy for 4x and the recording strategy for 6x are the strategies prescribed without consideration of the recording speed of 8x, the laser power at the time of executing the OPC process is largely different from the laser power at the time of the recording of the data at the recording speed of 8x, and the pulse width thereof is also largely different. Hence, though the estimated optimum recording power can be calculated, the accuracy cannot be always high in some cases of the characteristic variations.

Figure 15A:
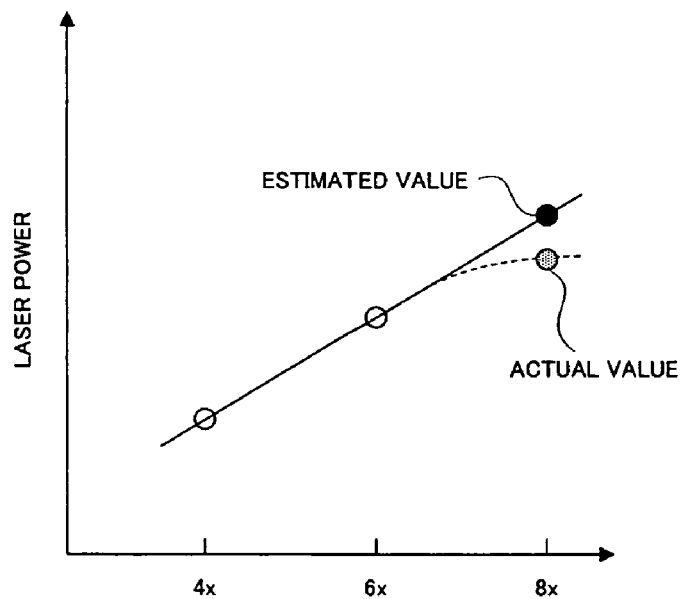
FIGS. 15A and 15B are graphs showing the optimum recording power at a recording speed of 8x in executing the OPC process at recording speeds of 4x and 6x.
Figure 15B:
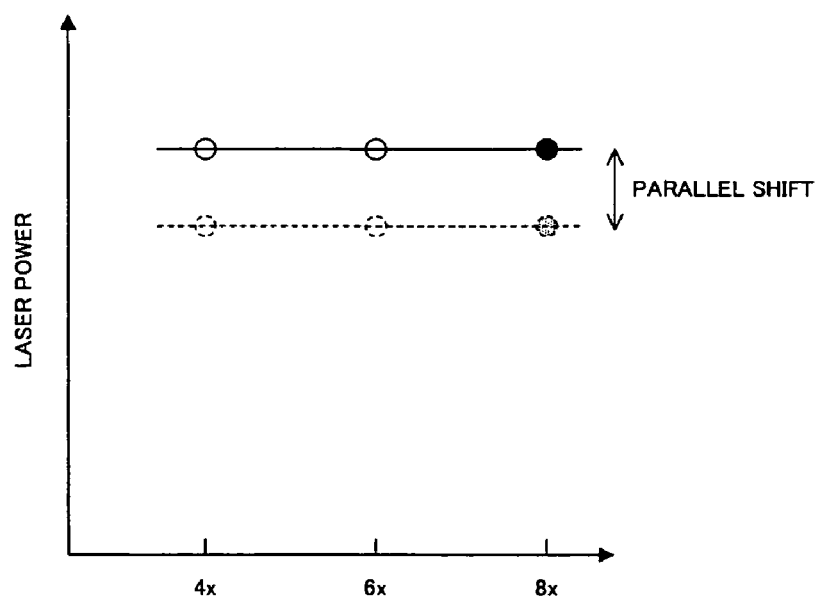

As for this, an explanation will be concretely given with reference to FIGS. 15A and 15B. FIGS. 15A and 15B are graphs showing the optimum recording power at the recording speed of 8x at the time of executing the OPC process at the recording speeds of 4x and 6x.

As shown in FIG. 15A, the estimated OPC process has such a problem that appropriate adjustment is impossible when the characteristic thereof varies like a dotted line. However, according to this embodiment, as shown in FIG. 15B, the optimum recording power of 8x calculated by the OPC process at the recording speed of 4x and 6x is substantially same as the optimum recording power at the actual recording speed of 8x. Even if the information recording apparatus 300 executing the OPC process is changed, or even if the secular change and the characteristic change of the optical pickup 352 occur, the graph is only translated, as shown in FIG. 15B. Namely, even in this case, the optimum recording power of the 8x and the optimum recording power at the actual recording speed of 8x becomes the substantially same value. This is because the special OPC strategy for 4x and the special OPC strategy for 6x, prescribing the same pulse width as that of the recording strategy for 8x, are used. Thereby, there is such a large advantage that the optimum recording power at the recording speed of 8x can be appropriately calculated without being affected due to the characteristic variation. That is, there is such a large advantage that the optimum recording power calculated at the recording speed of 4x (or 6x) can be used as the optimum recording power at the recording speed of 8x without any change, which is not realized in the normal OPC process.

Returning to FIG. 10, similarly to such a state that the laser beam is irradiated with the optimum recording power calculated in step S102 or S103, by the control of the CPU 354 being the one concrete example of "control unit" in the present invention, the optical pickup 352 is controlled (step S104). With using the recording strategy for lx, the optimum recording power calculated in step S102 or S103 is set as the recording laser power.

As described above, by the test writing (OPC process) with using the special OPC strategy, if the OPC process is executed at the recording speeds of 4x and 6x, the optimum recording power at the recording speed of 8x can be calculated without actually executing the OPC process at the recording speed of 8x. Particularly, when the recording speed becomes high, the rotation speed of the optical disc 100 correspondently becomes high, too. Therefore, particularly on the inner circumferential side of the optical disc, the rotation speed cannot be realized. Even if the rotation speed is realized, which causes the damage of the optical disc 100, unstable servo and deterioration of the detection accuracy of the target β, and the OPC process cannot be appropriately executed. The OPC process by the special OPC strategy solves such a problem. Even if the recording speed becomes high, the optimum recording power at the high recording speed can be advantageously calculated by executing the OPC process at the lower recording speed.

In the above-mentioned example, the OPC process is executed at the lower recording speed of 4x in order to calculate the optimum recording power at the higher recording speed of 8x. Of course, by the similar method, the OPC process may be executed at the higher recording speed of 8x with using the special OPC strategy for 8x in order to calculate the optimum recording power at the recording speed of 4x. Namely, by executing the OPC process at the recording speed of 8x higher than the recording speed of 4x at which the data is actually recorded, the optimum recording power at the recording speed of 4x can be calculated. Moreover, in this case, since the OPC pattern is recordable at the relatively high recording speed of 8x, the time necessary for the calculation of the optimum recording power can be advantageously reduced.

[Modification]

In the above embodiment, the test writing with using the special OPC strategy is performed as the test writing by the OPC. However, the application of this invention is not limited to this. Namely, other various kinds of test writing can be applied. But in the present invention, since the recording power is corrected during the actual recording based on the actual recording power information obtained by the test writing as described above, it is preferable that the test writing method capable of obtaining the actual recording power information with high accuracy is applied. In terms of this, the test writing with using the above-mentioned special OPC strategy is one preferred example.

In the above-mentioned embodiment, the optical disc 100 and the recorder according to the optical disc 100 are explained as the examples of the information recording medium and the information recording apparatus, respectively. However, this invention is not limited to the optical disc and the recorder, and it is applicable to various kinds of information recording media and recorders thereof, corresponding to high-density recording and high-transmission rate.

This invention is not limited to the above-mentioned embodiment. It is suitably variable within a range of concepts and idea of this invention readable in Claim and Specification, and an information recording and reproduction apparatus and an information recording medium including such a variation are included in the technical range of this invention, too.

INDUSTRIAL APPLICABILITY

This invitation is usable for information recording onto an optical disc such as a DVD-R/RW, a DVD+R/RW, a Blu-ray disc, an AOD (Advanced Optical Disc) and a CD-R/RW.

The invention claimed is:

1. An information recording apparatus comprising:
   a recording unit which irradiates a laser light on an information recording medium to record data thereon;
   a determination unit which stops recording by the recording unit at a time when predetermined amount of data is recorded during actual data recording and determines whether or not recording quality of recorded data is within an appropriate range based on reproduction data obtained by reproducing the recorded data;
   a correction unit which corrects a recording power of the recording unit so that the recording quality becomes within the appropriate range, when it is determined that the recording quality is out of the appropriate range; and
   a test writing unit which obtains (i) a special OPC strategy which prescribes a waveform of the laser light used for calculating the optimum recording power of the laser light at a time of recording of the information at a second recording speed, which second recording speed is different from a first recording speed, at the first recording speed, and (ii) a recording strategy which prescribes the waveform of the laser light used for recording the information at the second recording speed, and executes test writing by using the special OPC strategy at the first recording speed to calculate the optimum recording power;

wherein the actual data recording starts with the optimum recording power determined by the test writing, wherein the test writing unit obtains a relation between a recording quality evaluation parameter and a recording power by the test writing using the special OPC write strategy of the waveform of the laser light used for calculating the optimum recording power of the laser light at the time of recording of the information at the second recording speed different from the first recording speed at the first recording speed, and wherein the correction unit corrects the recording power based on the relation between the recording quality evaluation parameter and the recording power.

2. The information recording apparatus according to claim 1, wherein the determination unit determines that the recording quality is within the appropriate range, when a recording quality evaluation parameter is within a predetermined range.

3. The information recording apparatus according to claim 1, wherein the recording quality evaluation parameter is one of an asymmetry, a β value and a modulation degree, calculated by reproducing the recorded data.

4. The information recording apparatus according to claim 1, wherein the recording quality evaluation parameter is an asymmetry calculated by reproducing the recorded data, and
wherein the determination unit determines that the recording quality is within the appropriate range, when the asymmetry is within a range of 5% pp from 0% as a center.

5. The information recording apparatus according to claim 1, wherein the predetermined amount is minimum data amount capable of calculating the recording quality evaluation parameter with necessary accuracy.

6. The information recording apparatus according to claim 1, wherein the determination unit repeats the determination until the recording quality obtained by a recording power corrected by the correction unit becomes within the appropriate range.

7. The information recording apparatus according to claim 1, wherein the determination unit executes the determination, when the actual data recording is executed by predetermined amount of recording data.

8. The information recording apparatus according to claim 1, wherein the determination unit executes the determination, when a temperature in a vicinity of a light source of the laser light varies by a predetermined temperature.

9. An information recording method comprising:
a recording process which irradiates a laser light on an information recording medium to record data thereon;
a determination process which stops recording at a time when predetermined amount of data is recorded during actual data recording and determines whether or not recording quality of recorded data is within an appropriate range based on reproduction data obtained by reproducing the recorded data;
a correction process which corrects a recording power of the recording unit so that the recording quality becomes within the appropriate range, when it is determined that the recording quality is out of the appropriate range; and
a test writing process which obtains (i) a special OPC strategy which prescribes a waveform of the laser light used for calculating the optimum recording power of the laser light at a time of recording of the information at a second recording speed, which second recording speed is different from a first recording speed, at the first recording speed, and (ii) a recording strategy which prescribes the waveform of the laser light used for recording the information at the second recording speed, and executes test writing by using the special OPC strategy at the first recording speed to calculate the optimum recording power;

wherein the actual data recording starts with the optimum recording power determined by the test writing, wherein the test writing unit obtains a relation between a recording quality evaluation parameter and a recording power by the test writing using the special OPC write strategy of the waveform of the laser light used for calculating the optimum recording power of the laser light at the time of recording of the information at the second recording speed different from the first recording speed at the first recording speed, and wherein the correction unit corrects the recording power based on the relation between the recording quality evaluation parameter and the recording power.

10. A computer program product in a non-transitory computer-readable medium executed by an information recording apparatus comprising a computer, making the computer function as:
a recording unit which irradiates a laser light on an information recording medium to record data thereon;
a determination unit which stops recording by the recording unit at a time when predetermined amount of data is recorded during actual data recording and determines whether or not recording quality of recorded data is within an appropriate range based on reproduction data obtained by reproducing the recorded data; and
a correction unit which corrects a recording power of the recording unit so that the recording quality becomes within the appropriate range, when it is determined that the recording quality is out of the appropriate range; and
a test writing unit which obtains (i) a special OPC strategy which prescribes a waveform of the laser light used for calculating the optimum recording power of the laser light at a time of recording of the information at a second recording speed, which second recording speed is different from a first recording speed, at the first recording speed, and (ii) a recording strategy which prescribes the waveform of the laser light used for recording the information at the second recording speed, and executes test writing by using the special OPC strategy at the first recording speed to calculate the optimum recording power;

wherein the actual data recording starts with the optimum recording power determined by the test writing, wherein the test writing unit obtains a relation between a recording quality evaluation parameter and a recording power by the test writing using the special OPC write strategy of the waveform of the laser light used for calculating the optimum recording power of the laser light at the time of recording of the information at the second recording speed different from the first recording speed at the first recording speed, and wherein the correction unit corrects the recording power based on the relation between the recording quality evaluation parameter and the recording power.

* * * * *